United States Patent
Nishida

(10) Patent No.: US 7,878,161 B2
(45) Date of Patent: Feb. 1, 2011

(54) SLIDING MODE CONTROL APPARATUS AND ADJUSTING METHOD

(75) Inventor: Hideyuki Nishida, Shizuoka-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 414 days.

(21) Appl. No.: 12/067,397

(22) PCT Filed: Sep. 22, 2006

(86) PCT No.: PCT/JP2006/319402

§ 371 (c)(1),
(2), (4) Date: Mar. 19, 2008

(87) PCT Pub. No.: WO2007/034995

PCT Pub. Date: Mar. 29, 2007

(65) Prior Publication Data

US 2009/0266318 A1 Oct. 29, 2009

(30) Foreign Application Priority Data

Sep. 22, 2005 (JP) ............................. 2005-276456

(51) Int. Cl.
F01L 9/04 (2006.01)
(52) U.S. Cl. .................. 123/90.11; 251/129.15; 251/129.16
(58) Field of Classification Search .............. 123/90.11; 251/129.01, 129.15, 129.16
See application file for complete search history.

(56) References Cited

U.S. PATENT DOCUMENTS

| 4,957,074 | A | 9/1990 | Weissler, II et al. |
| 6,427,651 | B1 | 8/2002 | Kemper et al. |
| 6,636,783 | B2 | 10/2003 | Yasui et al. |
| 6,668,200 | B2 | 12/2003 | Yasui et al. |
| 6,668,214 | B2 | 12/2003 | Yasui et al. |
| 6,830,032 | B2 | 12/2004 | Yasui et al. |
| 7,050,864 | B2 | 5/2006 | Yasui et al. |

(Continued)

FOREIGN PATENT DOCUMENTS

EP 1 052 380 11/2000

(Continued)

OTHER PUBLICATIONS

Anonymously, "Electromagnetic Eugine Valve Actuator With Low Seating Velocity", Research Disclosure, No. 352, p. 518, 1993.

*Primary Examiner*—Ching Chang
(74) *Attorney, Agent, or Firm*—Oblon, Spivak, McClelland, Maier & Neustadt, L.L.P.

(57) ABSTRACT

A sliding mode control apparatus. When displacing a controlled object to which an urging force is applied by an elastic member from one displacement end to the other displacement end, the control apparatus sets a switching hyperplane and controls the controlled object by using a sliding mode control in such a manner that a state quantity of the controlled object is converged on the switching hyperplane. In the sliding mode control, the control apparatus switches an operation mode for controlling the controlled object when the controlled object passes an operation switching point. The control apparatus detects disturbance in the sliding mode control and a change with time of the elastic member, and changes the operation switching point in accordance with both of the detected disturbance and the detected change with time.

27 Claims, 22 Drawing Sheets

U.S. PATENT DOCUMENTS 7,216,006 B2 5/2007 Yasui et al.
2003/0009240 A1 1/2003 Yasui et al.

FOREIGN PATENT DOCUMENTS

| | | |
|---|---|---|
| EP | 1 217 177 | 6/2002 |
| EP | 1 308 802 | 5/2003 |
| JP | 11 257036 | 9/1999 |
| JP | 2000 8894 | 1/2000 |
| JP | 2002-341904 | 11/2002 |
| JP | 2002-364434 | 12/2002 |
| JP | 2003-41957 | 2/2003 |
| JP | 2003 202901 | 7/2003 |

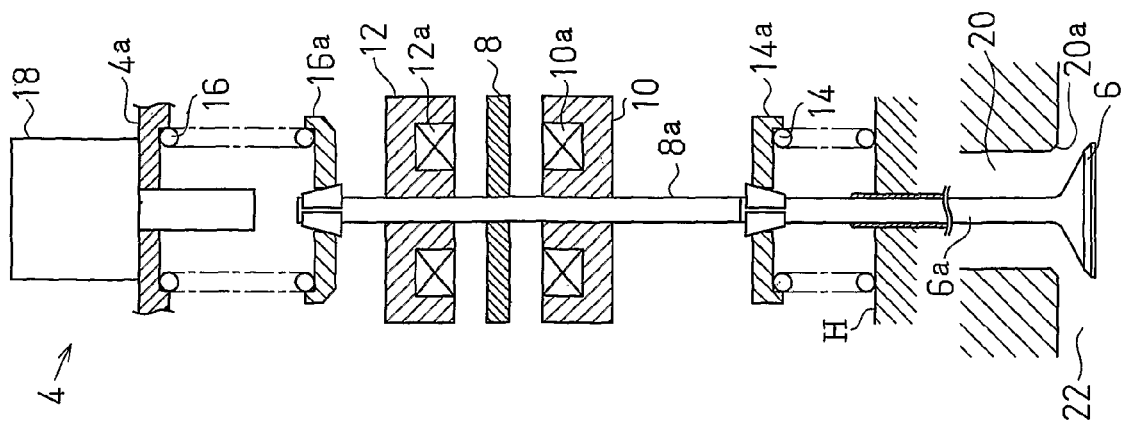
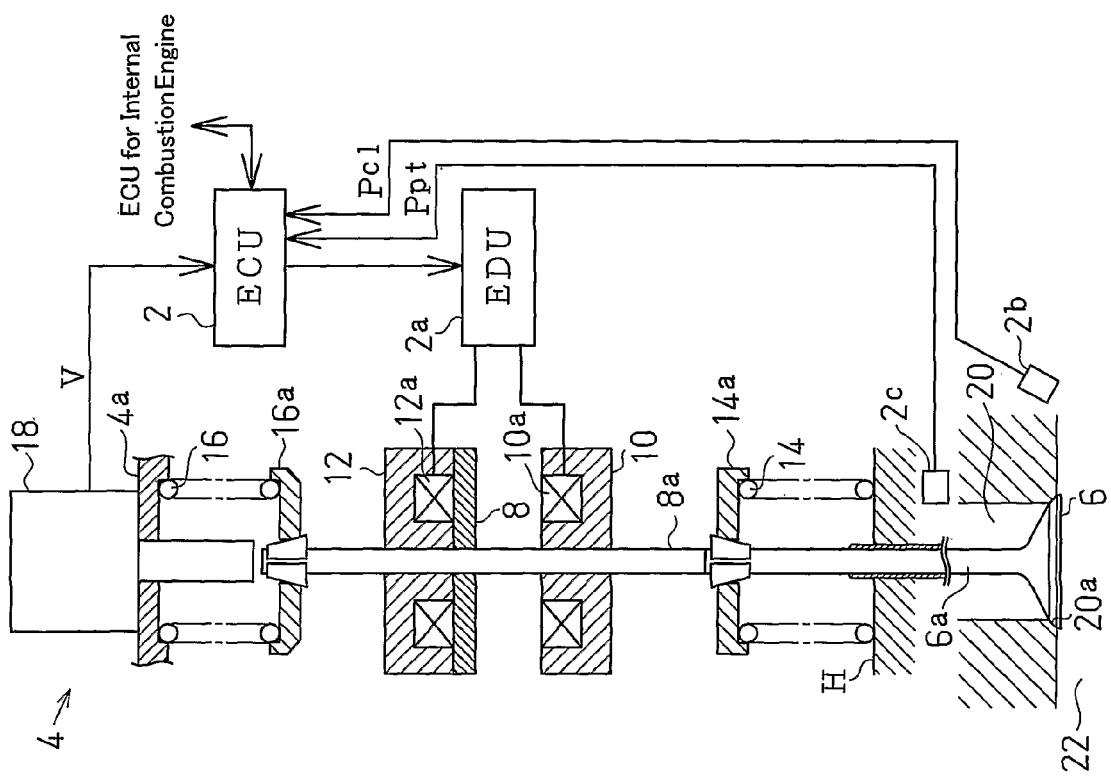

SLIDING MODE CONTROL APPARATUS AND ADJUSTING METHOD

TECHNICAL FIELD

The present invention relates to a sliding mode control apparatus for setting a switching hyperplane at a time of displacing a controlled object to which an urging force is applied by an elastic member from one displacement end to the other displacement end, and controlling the controlled object in such a manner that a state quantity of the controlled object is converged on the switching hyperplane, and an adjusting method of the apparatus.

BACKGROUND ART

In a control system having a spring mass system such as an electromagnetic valve, it is hard to sufficiently secure robustness with respect to a disturbance, a characteristic change of the electromagnetic valve or the like, in accordance with a control method such as a PID control or the like. Accordingly, there has been considered such a control as to converge a state quantity of a controlled object on a switching hyperplane expressed by a desirably designed linear function in accordance with a high gain control by applying a sliding mode control to the control system mentioned above, and bind it on the switching hyperplane. In the sliding mode control apparatus mentioned above, there has been proposed a technique which can further satisfy a plurality of request elements without contradiction (for example, Japanese Laid-Open Patent Publication No. 2003-202901).

However, the Japanese Laid-Open Patent Publication No. 2003-202901 does not cope with a case that an external force caused by a cylinder internal pressure of an internal combustion engine or the like is applied as a disturbance, or a case that a neutral point of a spring of an electromagnetic valve is changed due to a change with time, and there is a risk that the operation is destabilized on the basis of an operating state of the internal combustion engine or the change with time. The destabilization mentioned above may be caused by a machine error generated at a time of manufacturing the controlled object such as the electromagnetic valve or the like.

DISCLOSURE OF THE INVENTION

An objective of the present invention is to prevent destabilization in a sliding mode control caused by a disturbance, a change with time or a machine error.

To achieve the foregoing objective and in accordance with a first aspect of the present invention, a sliding mode control apparatus is provided. When displacing a controlled object to which an urging force is applied by an elastic member from one displacement end to the other displacement end, the control apparatus sets a switching hyperplane and controls the controlled object by using a sliding mode control in such a manner that a state quantity of the controlled object is converged on the switching hyperplane. In the sliding mode control, the control apparatus switches an operation mode for controlling the controlled object when the controlled object passes an operation switching point provided in a displacement region of the controlled object.

The control apparatus includes a disturbance detecting section that detects disturbance in the sliding mode control, and a changing section that changes the operation switching point in accordance with the disturbance detected by the disturbance detecting section. Alternatively, the control apparatus may include a change with time detecting section that detects a change with time of the elastic member, and a changing section that changes the operation switching point in accordance with the change with time detected by the change with time detecting section.

In accordance with a second aspect of the present invention, a sliding mode control apparatus is provided. When displacing a controlled object to which an urging force is applied by an elastic member from one displacement end to the other displacement end, the control apparatus sets a switching hyperplane and controls the controlled object by using a sliding mode control in such a manner that a state quantity of the controlled object is converged on the switching hyperplane. The control apparatus holds the controlled object in a floating state at a target floating position in the vicinity of at least one of the displacement ends.

The control apparatus includes a disturbance detecting section that detects disturbance in the sliding mode control, and a changing section that changes the target floating position in accordance with the disturbance detected by the disturbance detecting section.

Alternatively, the control apparatus may include a change with time detecting section that detects a change with time of the elastic member, and a changing section that changes the target floating position in accordance with the change with time detected by the change with time detecting section.

In accordance with a third aspect of the present invention, an adjusting method for a sliding mode control apparatus is provided. The control apparatus obtains, as a detection value of a displacement sensor, a position of a controlled object to which an urging force is applied by an elastic member, and converts the detection value to a displacement of the controlled object based on a predetermined relationship. When displacing the controlled object from one displacement end to the other displacement end, the control apparatus sets a switching hyperplane and controls the controlled object by using a sliding mode control in such a manner that a state quantity of the controlled object, which state quantity is based on the converted displacement, is converged on the switching hyperplane. In the sliding mode control, the control apparatus switches an operation mode for controlling the controlled object when the controlled object passes an operation switching point provided in a displacement region of the controlled object.

The method includes obtaining a detection value from the displacement sensor in a state where the controlled object is located at a known displacement, converting a known displacement state to a detection value of the displacement sensor according to the relationship, and correcting the relationship based on a difference between the detection value obtained from the displacement sensor and the detection value obtained from the conversion. Alternatively, the method may include: obtaining a detection value from the displacement sensor in a specific displacement state of the controlled object, the specific displacement state being determined based on an equation of motion representing a motional state of the controlled object; converting the specific displacement state to a detection value of the displacement sensor according to the relationship; and correcting the relationship based on a difference between the detection value obtained from the displacement sensor and the detection value obtained from the conversion.

BRIEF DESCRIPTION OF THE DRAWINGS

FIG. 1 is an explanatory view of a structure of an electromagnetic valve (in a closed state) and a control mechanism thereof in accordance with a first embodiment;

FIG. 2 is an explanatory view of a neutral state of the electromagnetic valve in accordance with the first embodiment;

BEST MODE FOR CARRYING OUT THE INVENTION

First Embodiment

Figure 4:
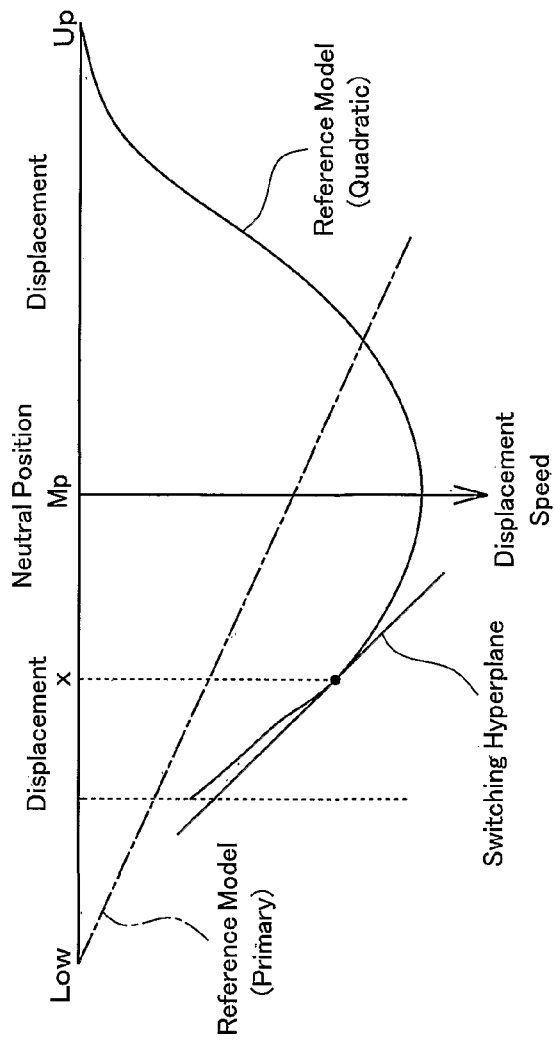
FIG. 4 is an explanatory view of a setting state of a switching hyperplane in a sliding mode control in accordance with the first embodiment.

FIG. 1 shows an electronic control unit (hereinafter, refer to as ECU) 2 functioning as a sliding mode control apparatus, and an electromagnetic valve 4 of an internal combustion engine in which a sliding mode control is executed. The internal combustion engine corresponds to an engine for a vehicle, and is constituted, for example, by a gasoline engine or a diesel engine comprising a plurality of cylinders.

The ECU 2 is provided with a cylinder internal pressure sensor 2b and a port pressure sensor 2c per cylinder, detects a cylinder internal pressure Pcl within each of the cylinders, and a port pressure Ppt in an exhaust port 20, executes a data communication with respect to the ECU for the internal combustion engine, and executes a data exchange of various data such as a control data, a detection data and the like. The electromagnetic valve 4 is described as an exhaust valve in the present embodiment; however, can be applied to an intake valve in the same manner by arranging a port pressure sensor in an intake port.

The electromagnetic valve 4 is structured such as to be provided with a poppet valve 6, an armature 8, a lower core 10, an upper core 12, a lower spring 14, an upper spring 16 and a lift sensor 18 (corresponding to a displacement sensor constituted by a differential transformer or the like). The ECU 2 formed mainly by a microcomputer adjusts a current amount applied to a lower coil 10a provided within the lower core 10 and an upper coil 12a provided in the upper core 12 via an electromagnetic drive circuit (hereinafter, refer to as an EDU) 2a. Accordingly, a driving force and a holding force applied to the armature 8 are adjusted by an electromagnetic force generated in the tower core 10 or the upper core 12.

In a state in which the armature 8 is attracted by and contacts the upper core 12 as shown in FIG. 1, an upper spring 16 is set to a compressed state between an upper retainer 16a and a casing 4a. Further, the poppet valve 6 is seated on a seat portion 20a of the exhaust port 20 so as to be in a valve close state by an urging force applied from the lower spring 14 via a lower retainer 14a, and the exhaust port 20 is closed.

On the other hand, in the case that no electromagnetic force is generated in the lower core 10 and the upper core 12, the armature 8 and the poppet valve 6 stop at a neutral position where the urging forces of the lower spring 14 and the upper spring 16 are balanced as shown in FIG. 2.

Figure 3:
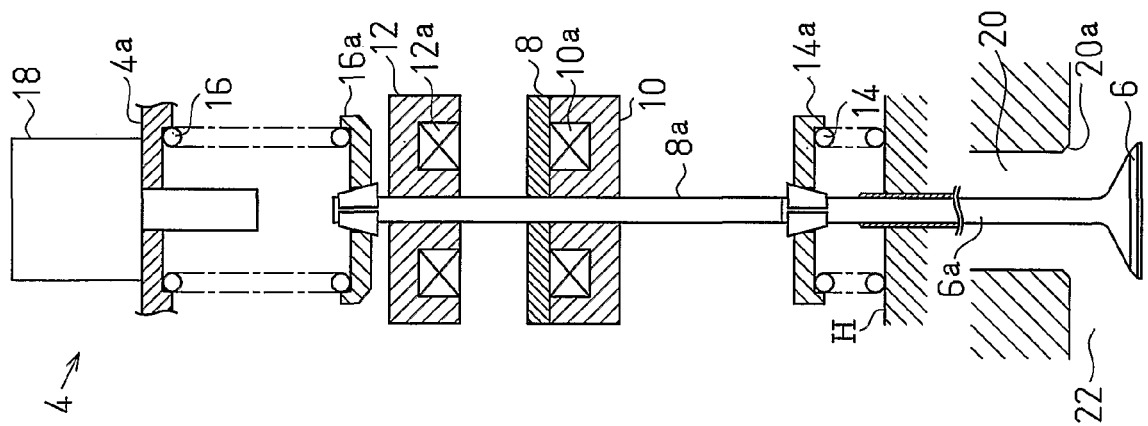
FIG. 3 is an explanatory view of an opening state of the electromagnetic valve in accordance with the first embodiment.

In a state in which the armature 8 is attracted by and contacts the lower core 10, the lower spring 14 is set to a compressed state between the lower retainer 14a and a cylinder head H via the armature rod 8a and a shaft portion 6a of the poppet valve 6 as shown in FIG. 3. Further, the poppet valve 6 comes to a position which is most away from the seat portion 20a of the exhaust port 20, and the exhaust port 20 comes to a fully open state.

In the case that the poppet valve 6 is moved from the fully closed state to the fully open state, it is possible to employ a control of fixing the armature 8 in a floating state at a target floating position slightly floating from the lower core 10 mentioned below, in place of setting to the completely fully open state as shown in FIG. 3. Alternatively, it is possible to employ a control of temporarily stopping at the target floating position and thereafter setting to the fully open state as shown in FIG. 3.

A description will be given of an operation of the electromagnetic valve 4 by the ECU 2. In the valve-close state of the electromagnetic valve 4 as shown in FIG. 1, a holding current is applied to the upper coil 12a for holding a state in which the poppet valve 6 is seated on the seat portion 20a.

In the opening timing of the electromagnetic valve 4, the holding current application to the upper coil 12a is stopped. Accordingly, the poppet valve 6 is detached from the seat portion 20a on the basis of the urging force of the upper spring 16. Further, in order to adsorb the armature 8 to the lower core 10, in a displacement region of the poppet valve 6 from the fully closed position to the fully open position, the attraction current application to the lower coil 10a is started and an amount of the current is adjusted. If the armature 8 is brought into contact with the lower core 10 as shown in FIG. 3, the holding current is circulated to the lower coil 10a, and the valve-open state is maintained.

In the closing timing of the electromagnetic valve 4, the holding current application to the lower coil 10a is stopped. Accordingly, the poppet valve 6 starts moving toward the seat portion 20a on the basis of the urging force of the lower spring 14. Further, in order to adsorb the armature 8 to the upper core 12, in a displacement region of the poppet valve 6 from the fully open position to the fully closed position, the attraction current application to the upper coil 12a is started and an amount of the current is adjusted. If the armature 8 is brought into contact with the upper core 12 as shown in FIG. 1, the holding current is circulated to the upper coil 12a, and the valve-close state is maintained.

At a time of displacing the poppet valve 6 and the armature 8 from one displacement end to the other displacement end as mentioned above, the current application control to the lower coil 10a and the upper coil 12a is executed by using a sliding mode control as mentioned below. Since the control aspects of the respective coils 10a and 12a are the same between the displacement process from the fully closed position to the fully open position, and the displacement process from the fully open position to the fully closed position, a description will be given below by exemplifying the displacement process from the fully closed position to the fully open position.

In the present embodiment, the displacement of the poppet valve 6 (actually including the armature 8) corresponding to a controlled object comes to a one-dimensional space (line segment) connecting the fully closed position and the fully open position, and a state quantity indicating a dynamic characteristic of the poppet valve 6 comes to a displacement and a displacement speed of the poppet valve 6. Further, a control is executed such that the displacement and the displacement speed (the state quantity) of the poppet valve 6 is converged to a previously set switching hyperplane (line segment) corresponding to a (one-dimensional) linear partial space within a two-dimensional space having the displacement and the displacement speed of the poppet valve 6 as degrees of freedom, on the two-dimensional linear space. Further, the switching hyperplane is set so as to be variable in correspondence to the displacement of the poppet valve 6, for satisfying a plurality of request elements relating to a control performance of the electromagnetic valve 4.

In detail, the switching hyperplane is set as a hyperplane which is brought into contact with a previously set reference model about the state quantity of the poppet valve 6 at the corresponding displacement point. The reference model is basically set on the basis of a displacement of the poppet valve 6 (a locus of the displacement and the displacement speed of the poppet valve 6) defined on the assumption that a disturbance, a damping element and an electromagnetic force do not exist. The reference model is set as the hyperplane near the other displacement end. The hyperplane is set such that the displacement speed comes to "0" in the other displacement end. Further, the hyperplane is set such that a change rate of the displacement speed becomes smaller than the reference model set on the basis of the displacement aspect of the poppet valve 6 defined on the assumption that the disturbance, the damping element and the electromagnetic force do not exist, near the other displacement end.

Accordingly, the switching hyperplane is set on the basis of the reference model set on the basis of the displacement of the poppet valve 6 defined on the assumption that the disturbance, the damping element and the electromagnetic do not exist, in the other portions than the portion near the other displacement end. In contrast, near the fully open position, the hyperplane is set such that the displacement speed comes to "0" at the fully open position.

FIG. 4 shows a specific procedure for establishing the switching hyperplane in accordance with the present embodiment. In the other displacement regions of the poppet valve 6 than a portion near a fully open position Low, the reference model is structured as follows. In other words, it comes to a locus of the displacement and the displacement speed of the poppet valve 6 at a time when the poppet valve 6 is displaced from a state in which the poppet valve 6 exists at a fully closed position Up to the fully open position Low only by the urging force of the lower spring 14 and the upper spring 16.

This locus (the reference model) comes to a quadratic curve calculated from a physical model having an elastic body constituted by the lower spring 14 and the upper spring 16 and a movable portion (the poppet valve 6 and the armature 8) coupled to the elastic body as a physical system. In other words, an equation of motion of the physical system is expressed by an expression 1, in which a weight of the movable portion is set to M, an elastic constant of the elastic body constituted by the lower spring 14 and the upper spring 16 is set to K, and a displacement (detected value) of the poppet valve 6 on the basis of a neutral position (position of balance) of the elastic body is set to x.

$$M \cdot \ddot{x} = -K \cdot x \qquad \text{[Expression 1]}$$

The displacement x of the poppet valve 6 corresponding to a solution of the expression 1 is determined as a periodic function, and the displacement speed is determined as a periodic function on the basis of a differential value therefrom. Further, a relational expression therebetween is determined as a quadratic curve shown in FIG. 4, on the basis of the displacement and the displacement speed.

Further, as shown in FIG. 4, with respect to the displacement region of the poppet valve 6 near the fully open position Low, the reference model mentioned above is set to a one-dimensional hyperplane (line segment) in which the change rate of the displacement speed with respect to the displacement is smaller than the quadratic curve mentioned above.

It is possible to satisfy a plurality of request elements requested in the control of the electromagnetic valve 4 by variably setting the switching hyperplane in accordance with the displacement x of the poppet valve 6 on the basis of the reference model. In other words, in the other positions than a portion near the fully open position Low, it is possible to displace the poppet valve 6 while effectively utilizing a natural vibration of the physical system, by controlling the actual displacement of the poppet valve 6 in accordance with the displacement of the poppet valve 6 at a time of displacing the poppet valve 6 only by the urging force of the elastic body mentioned above. Therefore, it is possible to reduce a time required for the displacement from the fully closed position Up to the fully open position Low.

On the contrary, near the fully open position Low, it is possible to suppress the impact at a time when the armature 8 is seated on the upper surface of the lower core 10, by binding the state quantity on the hyperplane in which a change rate of the displacement speed is small.

It is possible to execute the control for cushioning the shock at a time of being seated while reducing the displacement time, by controlling the electromagnetic valve 4 in such a manner as to bind the state quantity on the switching hyperplane variably set in correspondence to the displacement of the poppet valve 6. On the contrary, for example, in the case of controlling the electromagnetic valve 4 by using the switching hyperplane shown by a single-dot chain line in FIG. 4 so as to cushion the shock at a time of being seated, the displacement time is increased.

The setting of the current application control to the electromagnetic valve 4 for executing the sliding mode control of binding the state quantity on the switching hyperplane is executed as follows. First, there is defined by an expression 2 a switching hyperplane (a tangent line in the displacement x of the quadratic reference model) contacted with the quadratic reference model in FIG. 4 at the displacement x of the poppet valve 6, and a primary reference model in FIG. 4.

$$\dot{x}=a\cdot x+b \qquad \text{[Expression 2]}$$

In this expression 2, coefficients a and b are actually constituted by a function of the displacement x of the poppet valve 6. Further, a switching function σ corresponding to a linear function defining the switching hyperplane is defined by an expression 3.

$$\sigma=\dot{x}-a\cdot x-b \qquad \text{[Expression 3]}$$

As is known from the expression 3, the hyperplane in which the switching function 6 is set to zero corresponds to the switching hyperplane.

Next, an actual physical system of the electromagnetic valve 4 is set to a system to which a sliding resistance between the movable portion and the fixed portion, and an electromagnetic force acting on the armature 8 are applied, in a structure in which the lower spring 14 and the upper spring 16 are coupled to the movable portion. An equation of motion of this system is expressed by an expression 4 by using a damping coefficient C between the movable portion and the fixed portion, and a sliding mode input Ul corresponding to the electromagnetic force applied to the armature 8 in a sliding mode state, in addition to the weight M, the elastic constant K, and the displacement x mentioned above.

$$M\cdot\ddot{x}=-K\cdot x-C\cdot\dot{x}+Ul \qquad \text{[Expression 4]}$$

In the sliding mode state, the state quantity of the electromagnetic valve 4 is next bound on the switching hyperplane, in other words, on the hyperplane in which the switching function σ comes to zero. Accordingly, the sliding mode input Ul is expressed by an expression 5 by using a fact that a time differential of the equation of motion (the expression 4) and the switching function σ is zero.

$$Ul=(C+M\cdot a)\cdot\dot{x}+K\cdot x \qquad \text{[Expression 5]}$$

Further, a reaching mode input (a feedback input) Unl converging the state quantity on the switching hyperplane at a time when the state quantity is away from the switching hyperplane is defined by an expression 6.

$$Unl=G\cdot\frac{\sigma}{|\sigma|} \qquad \text{[Expression 6]}$$

The feedback gain G is set in such a manner as to satisfy a condition for reaching the switching hyperplane, in other words, a reaching condition corresponding to a condition for reaching the sliding mode. The gain G satisfying the reaching condition is set by using a Liapunov function method in the present embodiment. In other words, the gain G is set such that the time differential expressed by an expression 7 becomes negative, for example, by setting $V=1/2\times\sigma\times\sigma^T$ to the Liapunov function.

$$\dot{V}=\sigma^T\cdot\dot{\sigma} \qquad \text{[Expression 7]}$$

In the expression 7, the switching function σ is going to converge to zero while using the reaching mode input Unl, by setting positive and negative of the gain G while having a predetermined absolute value, in such a manner that the time differential of the Liapunov function becomes negative.

Figure 5:
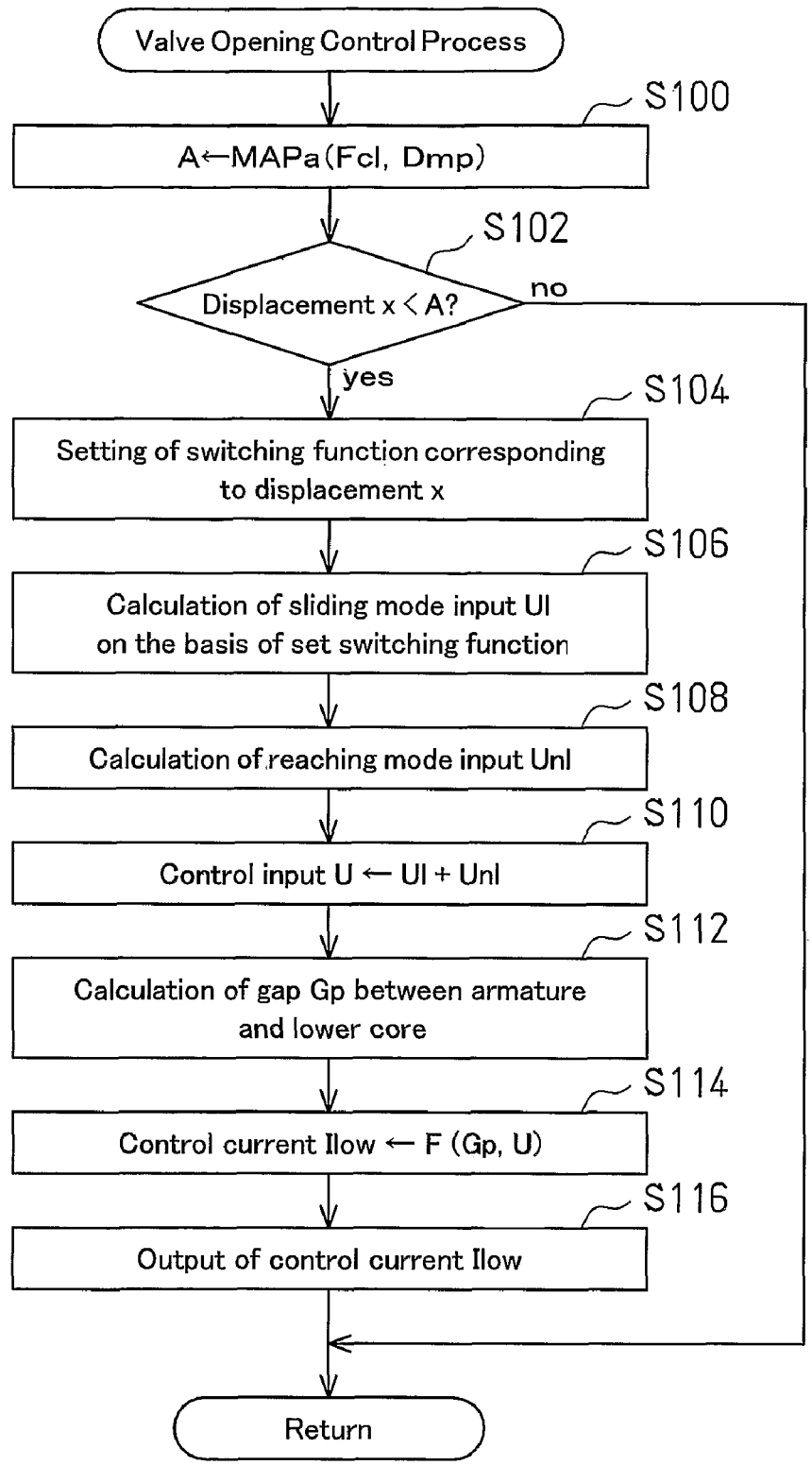
FIG. 5 is a flowchart of a valve opening control process executed by an ECU in accordance with the first embodiment.

A description will be given of the valve opening control process of the electromagnetic valve 4 executed by the ECU 2 with reference to FIG. 5. FIG. 5 is a flowchart showing a processing procedure of the control. This process is executed repeatedly at a time cycle. When starting the valve opening control process, the ECU 2 stops the holding current applied to the upper coil 12a. Accordingly, the armature 8 starts moving away from the upper core 12, and the poppet valve 6 starts moving away from the seat portion 20a in conjunction therewith.

If the valve opening control process (FIG. 5) is started, the attraction current application start displacement A is set (S100). The attraction current application start displacement A corresponds to a threshold value for judging the displacement starting the attraction force to the armature 8 by the lower core 10 in accordance with the sliding mode control.

In the attraction current application start displacement A, a proper value on the sliding mode control is changed in correspondence to a cylinder internal pressure external force Fcl on the basis of a pressure difference between an inner side and an outer side of a combustion chamber 22 (FIG. 1), and a deviation Dmp with time of a neutral position Mp shown in FIGS. 2 and 4. Accordingly, in the step S100, the attraction current application start displacement A is calculated on the basis of the cylinder internal pressure external force Fcl corresponding to the disturbance, and the deviation (the neutral position deviation) Dmp of the neutral position Mp corresponding to the change with time, in accordance with a map MAPa shown in FIG. 6.

The cylinder internal pressure external force Fcl corresponds to an external force generated in the poppet valve 6 on the basis of a difference "Pcl−Ppt" between a cylinder internal pressure Pcl sequentially detected by the cylinder internal pressure sensor 2b and a port pressure Ppt sequentially detected by the port pressure, sensor 2c, and is calculated by a map and a function on the basis of the value of the difference "Pcl−Ppt".

In accordance that the cylinder internal pressure external force Fcl generated on the basis of "Pcl−Ppc" becomes larger, it is necessary to apply the attraction current early against the cylinder internal pressure external force Fcl at a time of the valve opening control. Accordingly, as shown by a contour line (a broken line) in FIG. 6, the attraction current application start displacement a is moved to the valve closing side in accordance with an increase of the cylinder internal pressure external force Fcl. Since the attraction current application is delayed in accordance with the increase of the cylinder internal pressure external force Fcl at a time of the valve closing control, there is formed a map having the same tendency as FIG. 6, although the map value is different.

The neutral position deviation Dmp employs a value which has been already detected in accordance with a neutral position deviation detecting process (FIGS. 7 to 14) mentioned below. If the neutral position deviation comes to the valve closing side as shown by the contour line (the broken line) in FIG. 6, the attraction current application start displacement A is moved to the valve closing side so as to be adapted thereto. On the contrary, if the neutral position deviation comes to the valve opening side, the attraction current application start displacement A is moved to the valve opening side so as to be adapted thereto.

The map MAPa is formed by previously determining an optimum parameter value in accordance with an experimentation and a simulation so as to map. The map MAPa may be formed in accordance with a forecasting expression determined by a statistical method (DoE or the like), an experimental formula determined by an experimentation, or a physically conducted physical formula, in addition to the above. The forming method of the map mentioned above is applied to the other maps mentioned below in the same manner.

If the attraction current application start displacement A is calculated by the step S100, it is judged whether or not the displacement x of the poppet valve 6 detected by the lift sensor 18 is below the attraction current application start displacement A (S102). If a relationship $x \geq A$ is established here (no in S102), the present process is temporarily finished.

If a relationship $x<A$ is established (yes in S102), the switching function is set on the basis of the displacement x of the poppet valve 6 (S104). This is set by previously providing the ECU 2 with a memory function for storing the reference model shown in FIG. 4, and calculating the tangential line of the reference model in the displacement x of the poppet valve 6. Further, the ECU 2 may be provided with a memory function for storing a data (a map or the like) relating to the switching function such as the coefficients a and b in the expression 3 in the respective displacements x of the poppet valve 6 within the ECU 2, and execute the switching function setting by the map.

The sliding mode input Ul is calculated on the basis of the switching function set as mentioned above (S106). In other words, the sliding mode input Ul is calculated by using the expression 5 from the switching function in the displacement x. Further, the reaching mode input Unl is calculated on the basis of the expression 6 from the switching function in the displacement x (S108).

The control input U corresponding to the electromagnetic force applied to the armature 8 is calculated on the basis of a total of the sliding mode input Ul and the reaching mode input Unl calculated as mentioned above (S110). Further, a gap Gp between the armature 8 and the lower core 10 is calculated on the basis of the displacement x detected by the lift sensor 18 (S112). Further, a current application control current amount Ilow to the lower coil 10a of the electromagnetic valve 4 is calculated in accordance with a calculation F using the gap Gp and the control input U (S114). The calculation F executes the calculation of the current application control current amount Ilow by providing the ECU 2 with a function for storing the physical model formula defining the current amount applied to the lower coil 10a of the electromagnetic valve 4 from the gap Gp and the control input U. Further, a map defining a relationship among the gap Gp, the control input U and the supply current amount to the lower coil 10a may be stored in the ECU 2. If the control input U is negative, the current application control amount is set to "0".

If the current application control current amount Ilow is calculated as mentioned above, the current application control to the lower coil 10a is executed on the basis of the current application control current amount Ilow (S116).

As mentioned above, the sliding mode control at a time of the valve opening drive is applied to the electromagnetic valve 4. Although the value is different, the sliding mode control is basically applied to the valve closing control time, in the same manner as the valve opening control process mentioned above.

Figure 7:
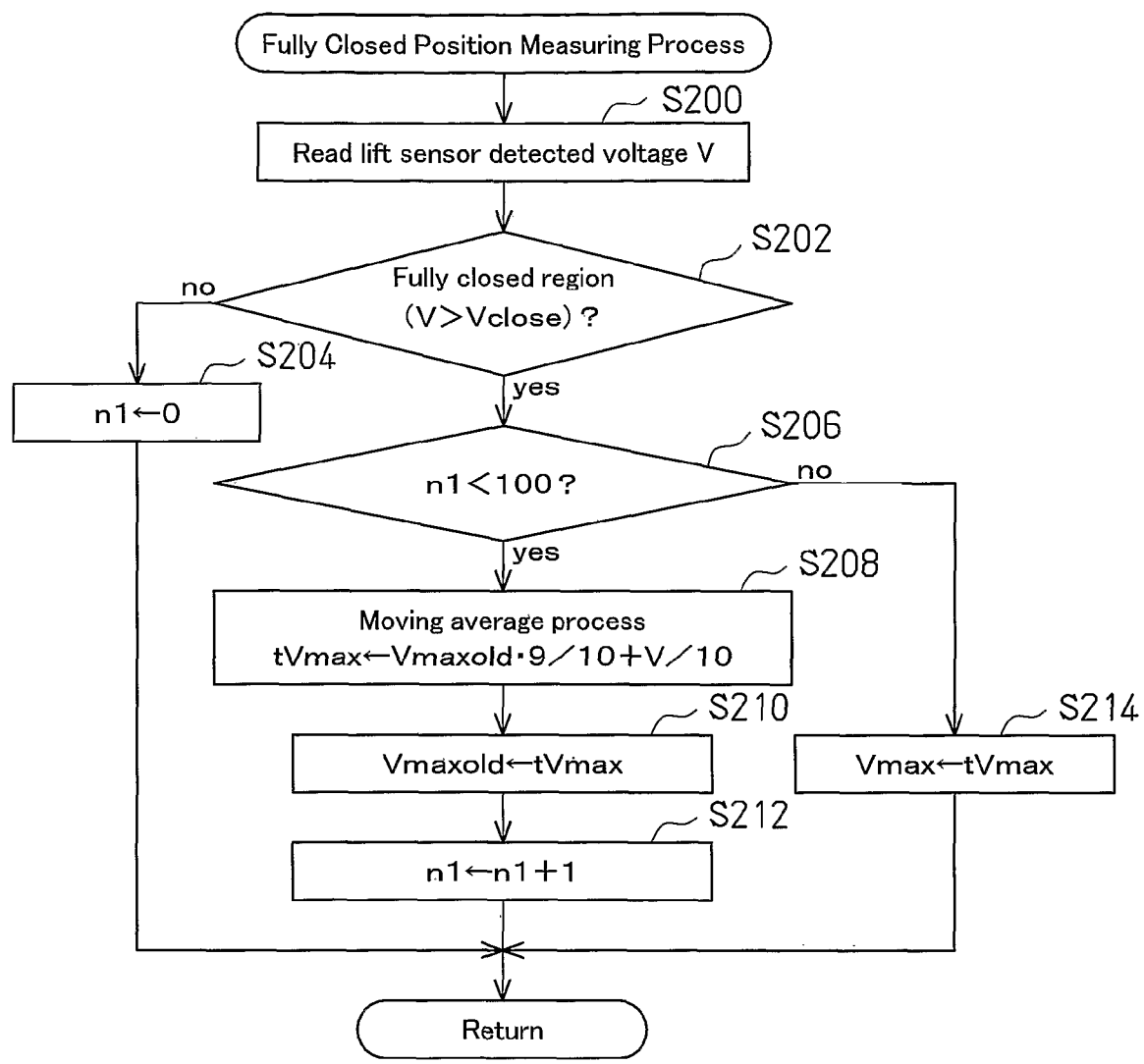
FIG. 7 is a flowchart of a fully closed position measuring process executed by the ECU in accordance with the first embodiment.
Figure 8:
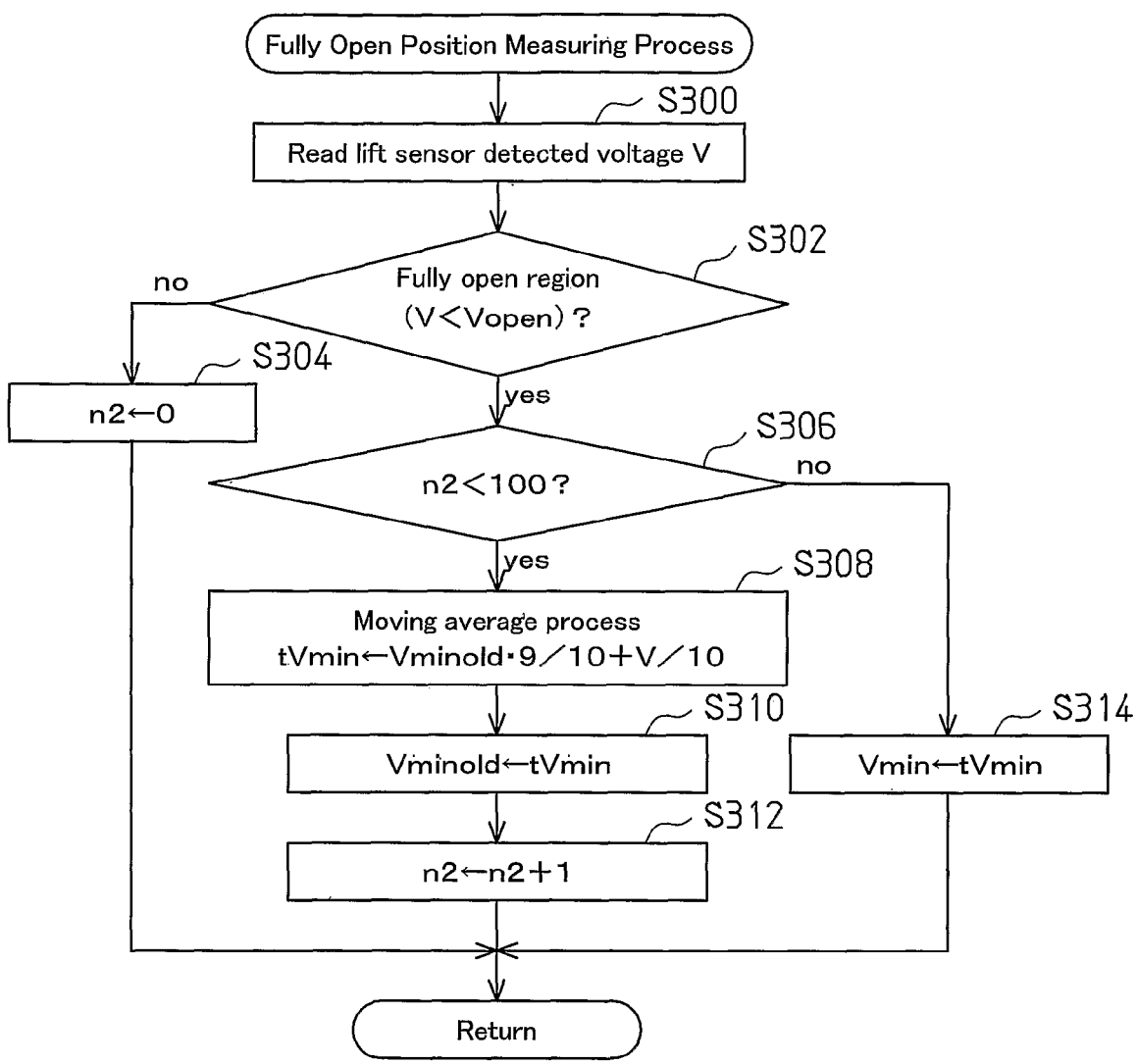
FIG. 8 is a flowchart of a fully open position measuring process.

Next, a description will be given of a detecting process of the neutral position deviation amount Dmp executed by the ECU 2. FIGS. 7 and 8 show a flowchart of a measuring process of a fully closed position Up and a fully open position Low executed for detecting the neutral position deviation amount Dmp. Each of the processes corresponds to a process which is repeatedly executed in a short time cycle during the normal operation of the internal combustion engine.

A description will be given of the fully closed position measuring process (FIG. 7). If the present process is started, a detected voltage V of the lift sensor 18 is first read (S200). The lift sensor 18 is structured such as to output a higher voltage in accordance that the poppet valve 6 and the armature 8 come closer to the fully closed position Up side (the displaced state in FIG. 1), and output a lower voltage in accordance that they come closer to the fully open position Low side (the displaced state in FIG. 3).

Next, it is judged whether or not the detected voltage V exists in the fully closed region (S202). In the judgment of the fully closed region, it is determined that the detected voltage V exists in the fully closed region in the case that the detected voltage V is higher than a previously set fully closed reference voltage Vclose.

If the relationship $V \leq $close is established (no in S202), a counter n1 for a fully closed region is cleared (S204), and the present process is temporarily finished.

If the relationship V>Vclose is established on the basis of the drive of the electromagnetic valve 4 (yes in S202), the detected voltage V exists in the fully closed region, so that it is judged whether or not the fully closed region counter n1 is smaller than 100 (S206). Since a relationship n1=0 is established just after the relationship V>Vclose is established from the state of $V \leq $Vclose (yes in S206), a moving average process of the detected voltage V is next executed in accordance with an expression 8, and a moving average value tVmax is calculated (S208).

$$tVmax \leftarrow Vmaxold \cdot 9/10 + V/10 \qquad \text{[Expression 8]}$$

Further, the moving average value tVmax determined by the expression 8 at this time is set as the previous value Vmaxold (S210).

Further, the counter n1 for the fully closed region is incremented (S212), the present process is temporarily finished.

In the next control cycle and after, as long as the relationship V>Vclose is established (yes in S202) and the relationship n1<100 is established (yes in S206), the moving average process (S208), the setting of the previous value Vmaxold (S210) and the increment of the fully closed region counter n1 (S212) mentioned above are repeated.

If the moving average process (S208) is repeated at 100 times on the basis of continuation of the relationship V>Vclose (yes in S202), a relationship n1=100 is established on the basis of the increment of the fully closed region counter n1 (S212). Accordingly, in the next control cycle, since a relationship n1≧100 is established (no in S206) after the decision outcome in the step S202 is judged to be positive, the moving average value tVmax is set in the fully closed time voltage Vmax (S214).

If the relationship V>Vclose (yes in S202) is continued in the later control cycle, the decision outcome in the step S206 is negative. Accordingly, the moving average process (S208) is not executed, the value of the moving average value tVmax is not changed, and the value of the fully closed time voltage Vmax is maintained.

Figure 10:
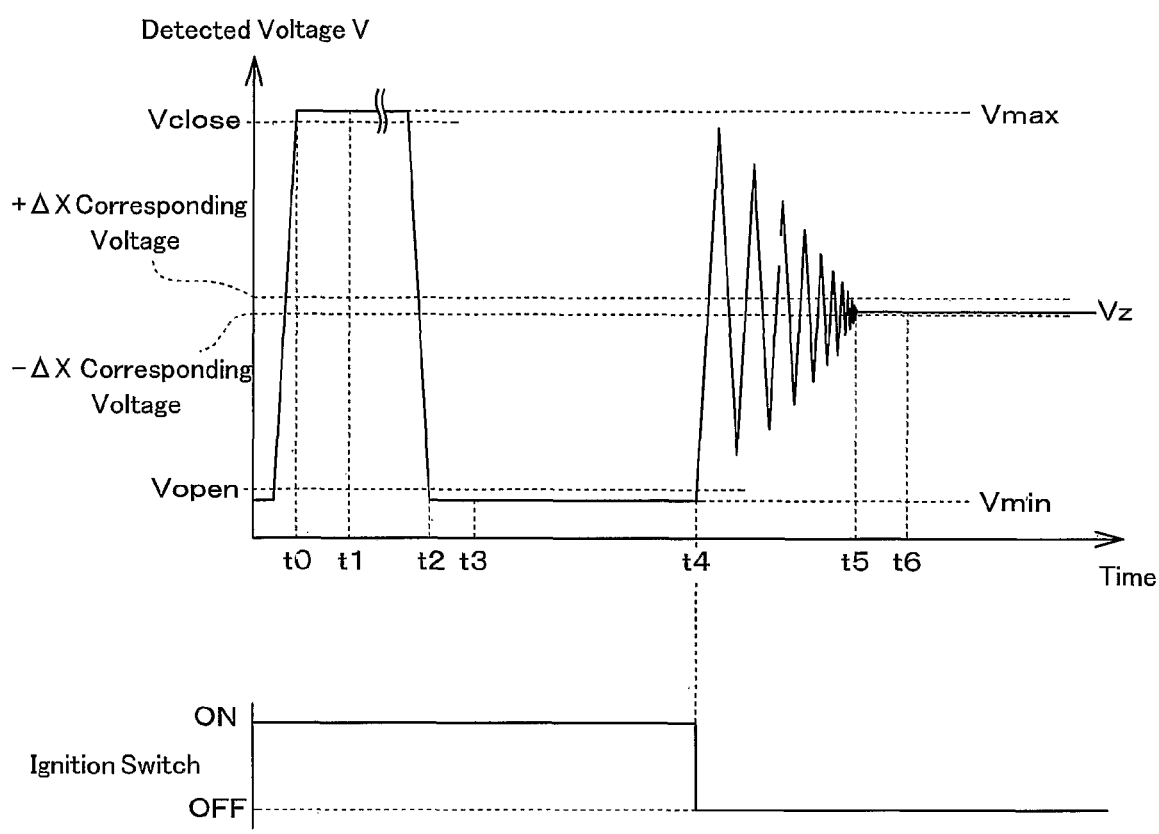
FIG. 10 is a timing chart showing an example of each of the fully closed position measuring process, the fully open position measuring process and the neutral position measuring process in accordance with the first embodiment.

As shown in a timing chart in FIG. 10 as mentioned above, the fully closed position is measured as the value of the fully closed time voltage Vmax at an early stage (t0 to t1) of each of the period, every time when the electromagnetic valve 4 comes to the fully closed position.

A description will be given of the fully open position measuring process (FIG. 8). The present process calculates the moving average in a minimum state of the detected voltage V, and a basic process is the same as FIG. 7 mentioned above.

If the present process is started, the detected voltage V of the lift sensor 18 is first read (S300). Next, it is judged whether or not the detected voltage V exists in the fully open region (S302). In the judgment of the fully open region, the fully open region is determined in the case that the detected voltage V is lower than a previously set fully open reference voltage Vopen.

If the relationship V≧Vopen is established (no in S302), a counter n2 for a fully open region is cleared (S304), and the present process is temporarily finished.

If the relationship V<Vopen is established (yes in S302), the detected voltage V exists in the fully open region, so that it is judged whether or not the fully open region counter n2 is smaller than 100 (S306). Since a relationship n2=0 is established just after the relationship V<Vopen is established from the state of V≧Vopen (yes in S306), a moving average process of the detected voltage V is next executed in accordance with an expression 9, and a moving average value tVmin is calculated (S308).

$$tVmin \leftarrow Vminold \cdot 9/10 + V/10 \qquad \text{[Expression 9]}$$

Further, the moving average value tVmin determined by the expression 9 at this time is set as the previous value Vminold (S310).

Further, the counter n2 for the fully open region is incremented (S312), the present process is temporarily finished.

In the next control cycle and after, as long as the relationship V<Vopen is established (yes in S302) and the relationship n2<100 is established (yes in S306), the moving average process (S308), the setting of the previous value Vminold (S310) and the increment of the fully open region counter n2 (S312) mentioned above are repeated.

If the moving average process (S308) is repeated at 100 times on the basis of continuation of the relationship V<Vopen (yes in S302), a relationship n2=100 is established on the basis of the increment of the fully open region counter n2 (S312). Accordingly, in the next control cycle, since a relationship n2≧100 is established (no in S306) after the decision outcome in the step S302 is judged to be positive, the moving average value tVmin is set in the fully open time voltage Vmin (S314).

If the relationship V<Vopen (yes in S302) is continued in the later control cycle, the decision outcome in the step S306 is negative. Accordingly, the moving average process (S308) is not executed, the value of the moving average value tVmin is not changed, and the value of the fully open time voltage Vmin is maintained.

As shown in the timing chart in FIG. 10 as mentioned above, the fully open position is measured as the value of the fully open time voltage Vmin at an early stage (t2 to t3) of each of the period, every time when the electromagnetic valve 4 comes to the fully open position.

Figure 9:
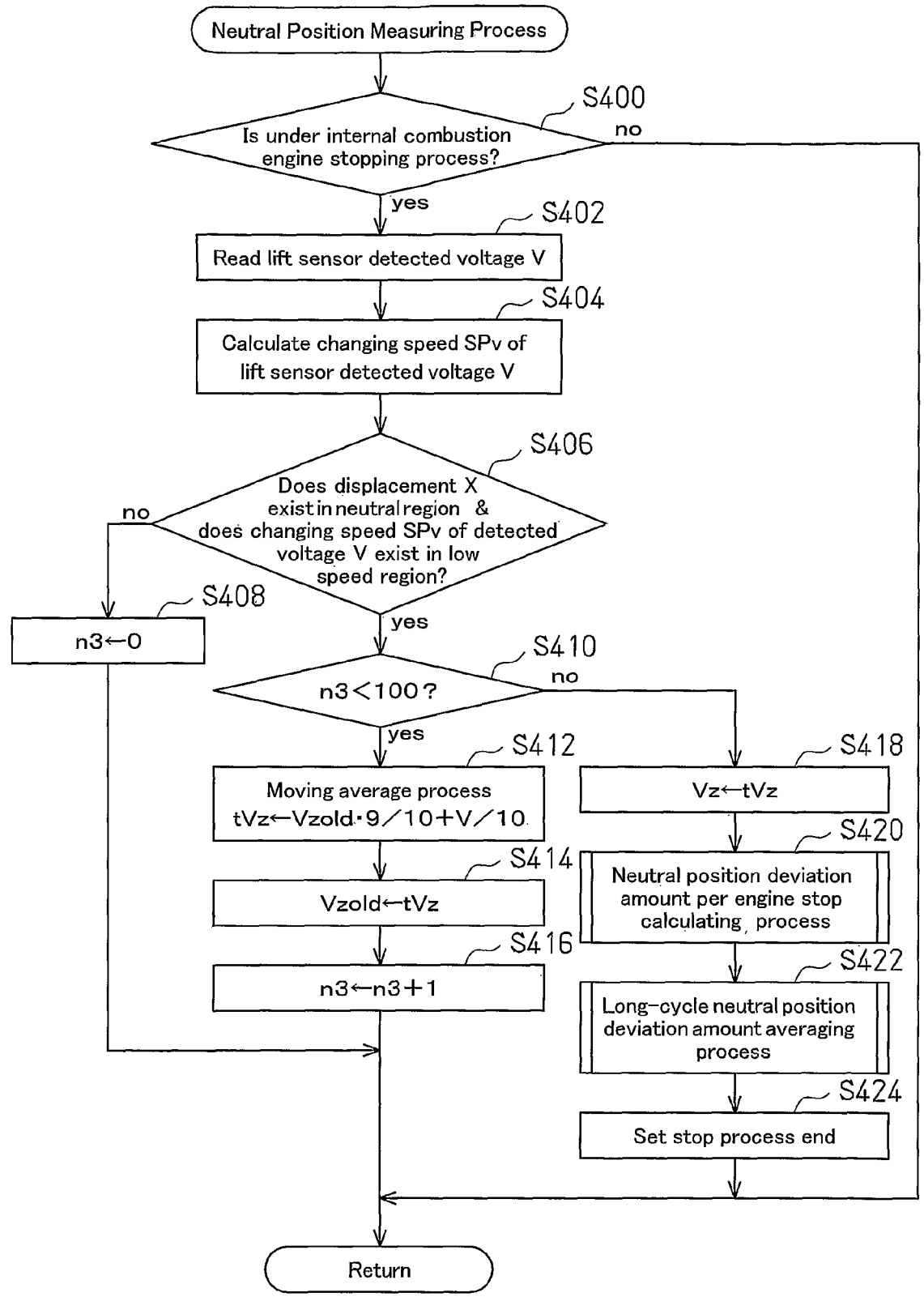
FIG. 9 is a flowchart of a neutral position measuring process.

FIG. 9 shows a flowchart of a neutral position measuring process executed for detecting the neutral position deviation amount Dmp. The present process corresponds to a process executed repeatedly at a short time cycle.

If the present process is started, it is judged whether or not the stop process of the internal combustion engine is executed (S400). In other words, in accordance with the present embodiment, it is judged whether or not an ignition switch is turned off, whereby the stop operation of the internal combustion engine is executed, on the basis of the signal from the ECU for the internal combustion engine.

If the internal combustion engine is under operation, or the stop process of the internal combustion engine is finished as in the present process (no in S400), the present process is temporarily finished.

If the ignition switch is just after being turned off, the it is determined that the internal combustion engine is under the stop operation (yes in S400: t4 in FIG. 10), and the detected voltage V of the lift sensor 18 is next read (S402).

Next, a changing speed SPv of the detected voltage V is calculated (S404). Since the detected voltage V is measured by the ECU 2 at a fixed cycle, the changing speed SPv employs a change dV of the detected voltage V for one cycle as the changing speed SPv.

Next, it is judged whether or not a displacement x corresponding to the detected voltage V exists in the neutral region, and the changing speed SPv exists in the low speed region (S406).

The neutral region is provided by setting a width ΔX around a displacement x=0 indicating the neutral position. Accordingly, if an expression 10 is satisfied, it is determined that the detected voltage V exists in the neutral region.

$$-\Delta X < x < +\Delta X \qquad \text{[Expression 10]}$$

A conversion into the displacement x (corresponding to the displacement data) from the detected voltage V is executed on the basis of a relationship f (FIG. 12) mentioned below.

The low speed region is provided by setting a width ΔSPv around a state in which a time change (V/s) of the detected voltage V is zero. Accordingly, if an expression 11 is satisfied, it is determined that the change speed SPv exists in the low speed region.

$$-\Delta SPv < SPv < \Delta SPv \qquad \text{[Expression 11]}$$

In the step S406, it may be judged whether or not the changing speed of the displacement x, that is, the moving speed of the poppet valve 6 exists in the low speed region, in place of the changing speed SPv of the detected voltage V. The changing speed of the displacement x is calculated in the step S404.

In a state in which the condition of the step S406 is not satisfied yet just after starting the stop process (no in S406), a counter n3 for a neutral position is cleared (S408), and the present process is temporarily finished.

If the expression 10 and the expression 11 are satisfied (yes in S406: t5 in FIG. 10), the detected voltage V becomes a value suitable for measuring the neutral position. Accordingly, it is judged whether or not the neutral position counter n3 is smaller than 100 (S410). If the determination of the step S406 is just after being changed to yes from no, a relationship n3=0 is established (yes in S410). Accordingly, the moving average process of the detected voltage V is next executed in accordance with an expression 12, and the moving average value tVz is calculated (S412).

$$tVz \leftarrow Vzold \cdot 9/10 + V/10 \quad \text{[Expression 12]}$$

A moving average value tVz determined by the expression 12 at this time is set to the previous value Vzold (S414).

Further, the neutral position counter n3 is incremented (S416), and the present process is temporarily finished.

In the next control cycle and after, as long as the decision outcome in the step S406 is judged to be positive and the relationship n3<100 is established (yes in S410), the moving average process (412), the setting of the previous value Vzold (S414) and the increment of the neutral position counter n3 (416) are repeated.

If the moving average process (S412) is repeated at 100 times on the basis of the continuation of the determination of yes in the step S406, the relationship n3=100 is established on the basis of the increment of the neutral position counter n3 (S416). Accordingly, since the relationship n3≧100 is established (no in S410) after the decision outcome in the step S406 is judged to be positive in the next control cycle, the moving average value tVz is set to the neutral position voltage Vz (S418: t6 in FIG. 10). The neutral position voltage Vz is determined as mentioned above.

Further, a neutral position deviation amount calculating process per engine stop (FIG. 11) mentioned below is executed (S420), and a long-cycle neutral position deviation amount averaging process (FIG. 13) mentioned below is executed (S422).

Further, a stop process end setting is executed (S424). Accordingly, in the next control cycle, since the decision outcome in the step S400 is negative, a substantial process in accordance with the neutral position measuring process (FIG. 9) is finished.

Figure 11:
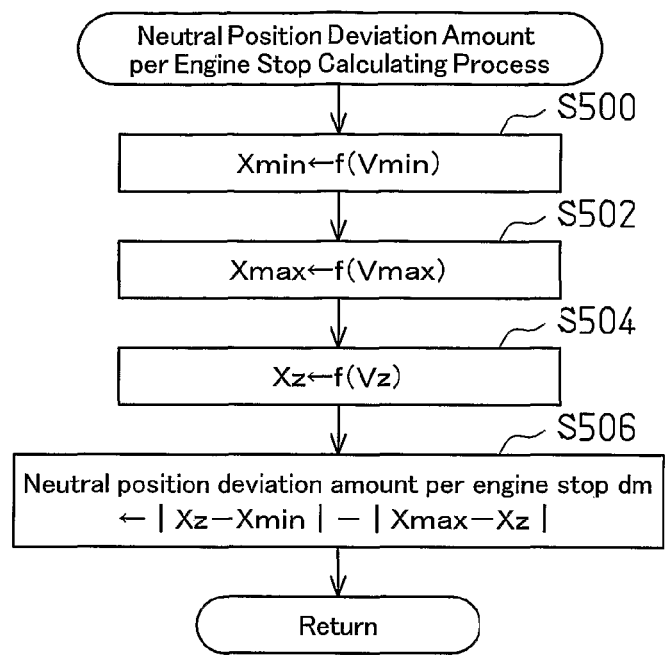
FIG. 11 is a flowchart of a neutral position deviation amount calculating process per engine stop executed by the ECU in accordance with the first embodiment.

A description will be given of the neutral position deviation amount calculating process per engine stop (FIG. 11).

Figure 12:
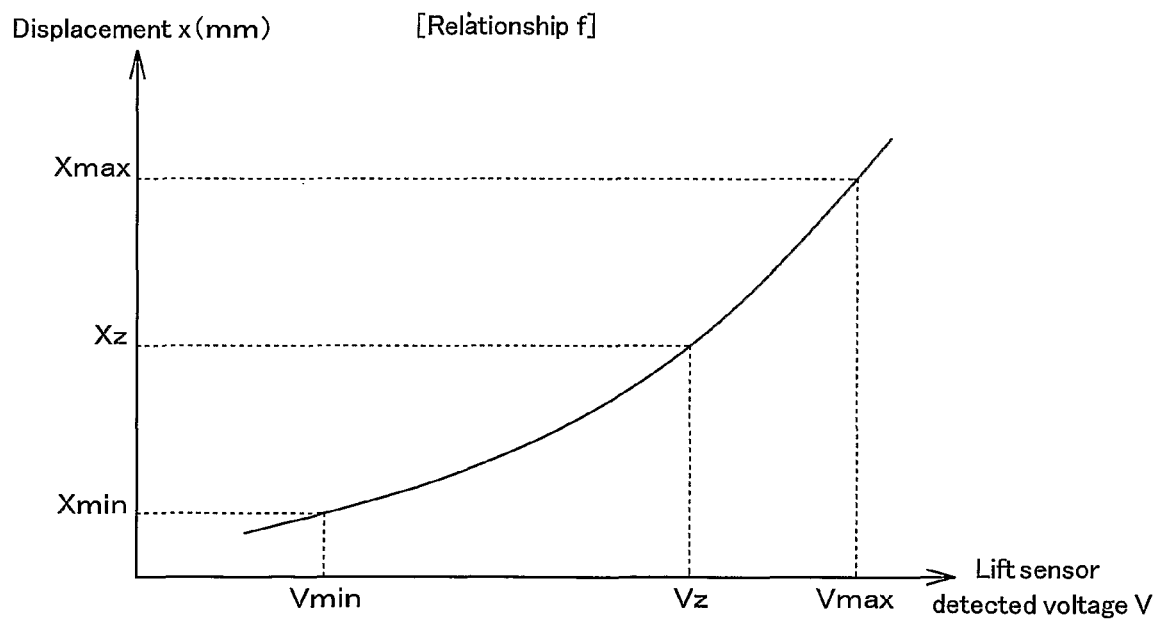
FIG. 12 is a graph showing the relationship f of a detected voltage V and a displacement x in the first embodiment.
Figure 13:
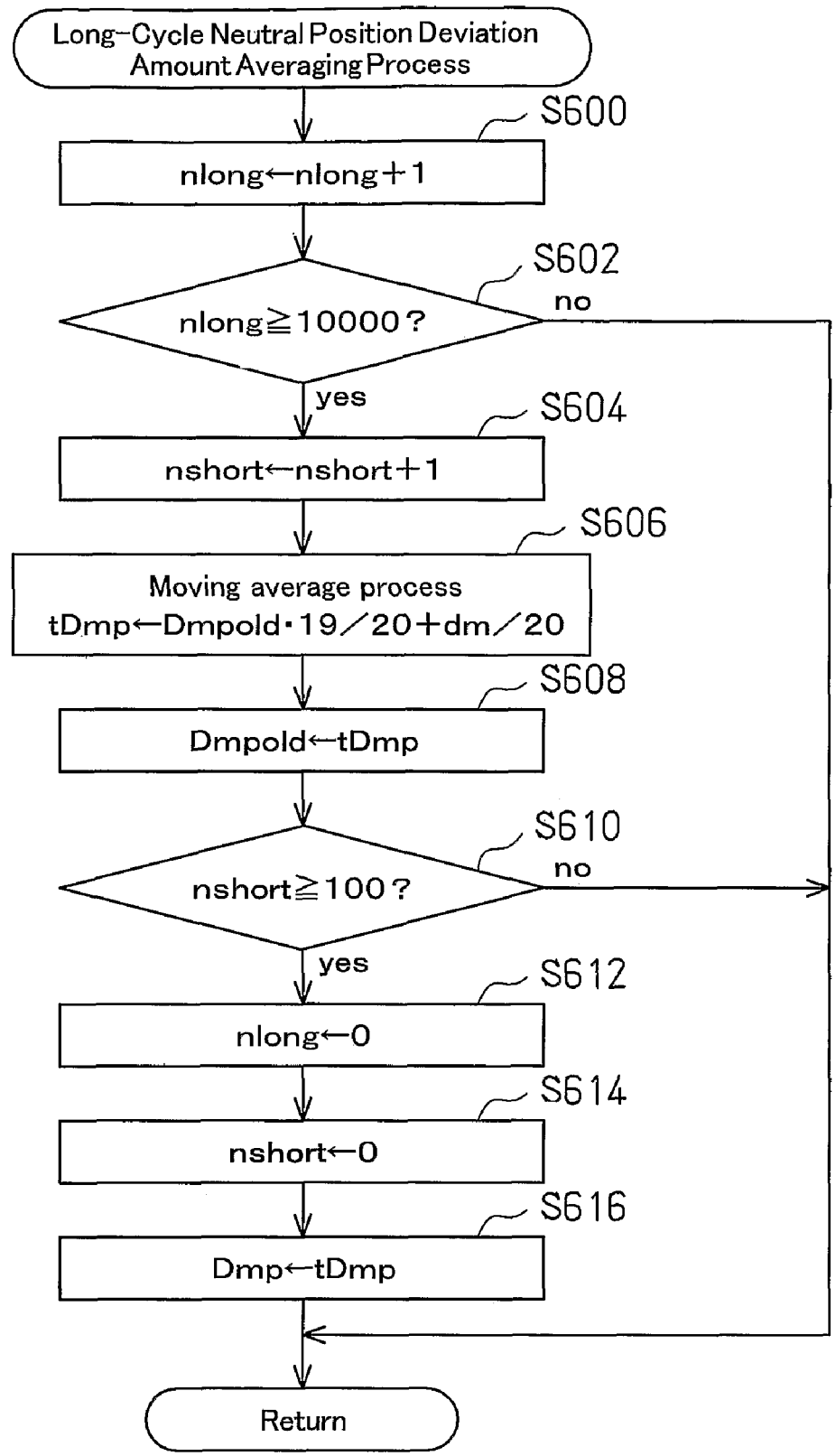
FIG. 13 is a flowchart of a long-period neutral position deviation amount averaging process executed by the ECU in accordance with the first embodiment.

If the present process is started, the already calculated fully open time voltage Vmin is first converted into the fully open displacement Xmin, on the basis of the relationship f between the detected voltage V of the lift sensor 18 and the displacement x of the poppet valve 6 expressed by the map or the function in FIG. 12 (S500). The detected voltage V of the lift sensor 18 does not have a straight-line relationship with the actual displacement x, but has a deviation from the straight-line relationship as shown by a curve in FIG. 12. Accordingly, in the case of calculating the neutral position deviation amount, since an error is generated if the detected voltage V is converted into the displacement x by a coefficient so as to be utilized for the calculation, the fully open time voltage Vmin is first converted into the fully open displacement Xmin on the basis of the relationship f in FIG. 12.

Next, the already calculated fully closed time voltage Vmax is converted into the fully closed displacement Xmax on the basis of the relationship f in FIG. 12 in the same manner (S502).

Further, the already calculated neutral position voltage Vz is converted into the neutral displacement Xz on the basis of the relationship f in FIG. 12 in the same manner (S504).

Further, a neutral position deviation amount per engine stop dm is calculated on the basis of these displacements Xmin, Xmax and Xz in accordance with an expression 13 (S506).

$$dm \leftarrow |Xz - Xmin| - |Xmax - Xz| \quad \text{[Expression 13]}$$

If a relationship the neutral position deviation amount per engine stop dm>0 is established, the neutral position is deviated to the closed side, and if dm<0, the neutral position is deviated to the open side.

The present process is finished as mentioned above. The neutral position deviation amount calculating process per engine stop (FIG. 11) is executed at one time per the internal combustion engine stop time as mentioned above. Accordingly, the neutral position deviation amount per engine stop dm is calculated per the internal combustion engine stop. The neutral position deviation amount per engine stop dm is stored within a non-volatile memory within the ECU 2 after the ignition switch is turned off.

Next, a description will be given of the long-cycle neutral position deviation amount averaging process (FIG. 13) for calculating a final neutral position deviation amount Dmp.

If the present process is started, a long-cycle counter nlong is first incremented (S600). A value of a long-cycle counter nlong is stored within the non-volatile memory.

Next, it is judged whether or not the long-cycle counter nlong is equal to or more than 10000 (S602). If a relationship the long-cycle counter nlong 21 10000 is established (no in S602), the present process is finished. Accordingly, the neutral position deviation amount per engine stop dm is determined in accordance with the neutral position deviation amount calculating process (FIG. 11) just before, however, the final neutral position deviation amount Dmp is not newly calculated.

If the long-cycle counter nlong is increased to satisfy a relationship nlong≧10000 (yes in S602), during the repeat of the internal combustion engine stop, a moving average counter nshort is next incremented (S604).

Next, the moving average process of the neutral position deviation amount per engine stop dm calculated in accordance with the neutral position deviation amount calculating process per engine stop (FIG. 11) at this time is next executed in accordance with an expression 14 so as to calculate the moving average value tDmp (S606).

$$tDmp \leftarrow Dmpold \cdot 19/20 + dm/20 \quad \text{[Expression 14]}$$

Further, the moving average value tDmp calculated by the expression 14 at this time is set to the previous value Dmpold (S608).

Next, it is judged whether or not the moving average counter nshort is equal to or more than 100 (S610). If the relationship the moving average counter nshort<100 is established (no in S610), the present process is temporarily finished. The moving average value tDmp, the previous value Dmpold and the moving average counter nshort are stored within the non-volatile memory.

If the long-cycle neutral position deviation amount averaging process (FIG. 13) is executed in succession to the neutral position deviation amount calculating process per engine stop (FIG. 11) per the internal combustion engine stop, the step S604 and the moving average process (S606 and S608) are repeated.

Further, if the increment of the moving average counter nshort is repeated, whereby the relationship nshort≧100 is established (yes in S610), the long-cycle counter nlong is cleared (S612), and the moving average counter nshort is cleared (S614). Further, the moving average value tDmp at this time is set as the final neutral position deviation amount Dmp (S616).

Figure 14:
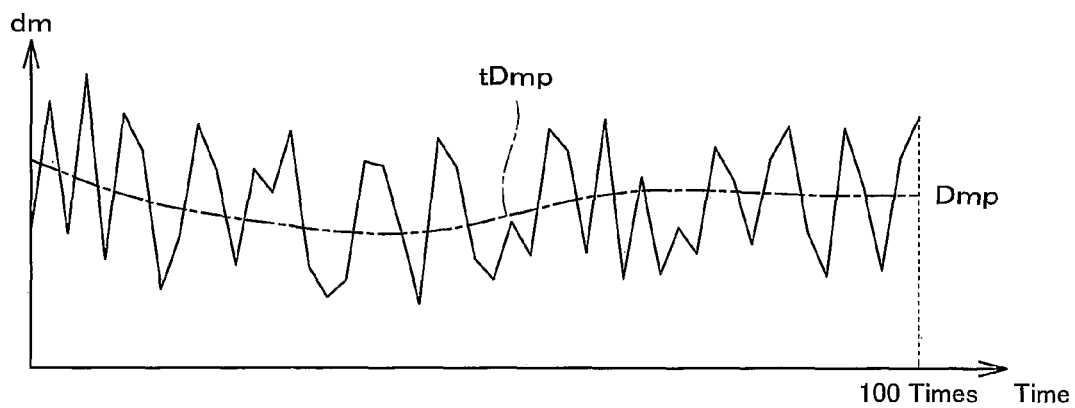
FIG. 14 is a timing chart showing an example of a process in the long-period neutral position deviation amount averaging process.

Accordingly, the final neutral position deviation amount Dmp is calculated by moving averaging the neutral position deviation amount per engine stop dm at 100 times as shown by a timing chart in FIG. 14 every 10000 engine stops. The final neutral position deviation amount Dmp calculated as mentioned above is used in the step S100 of the valve opening control process (FIG. 5) mentioned above, whereby it is possible to determine the attraction current application start displacement A.

Figure 15:
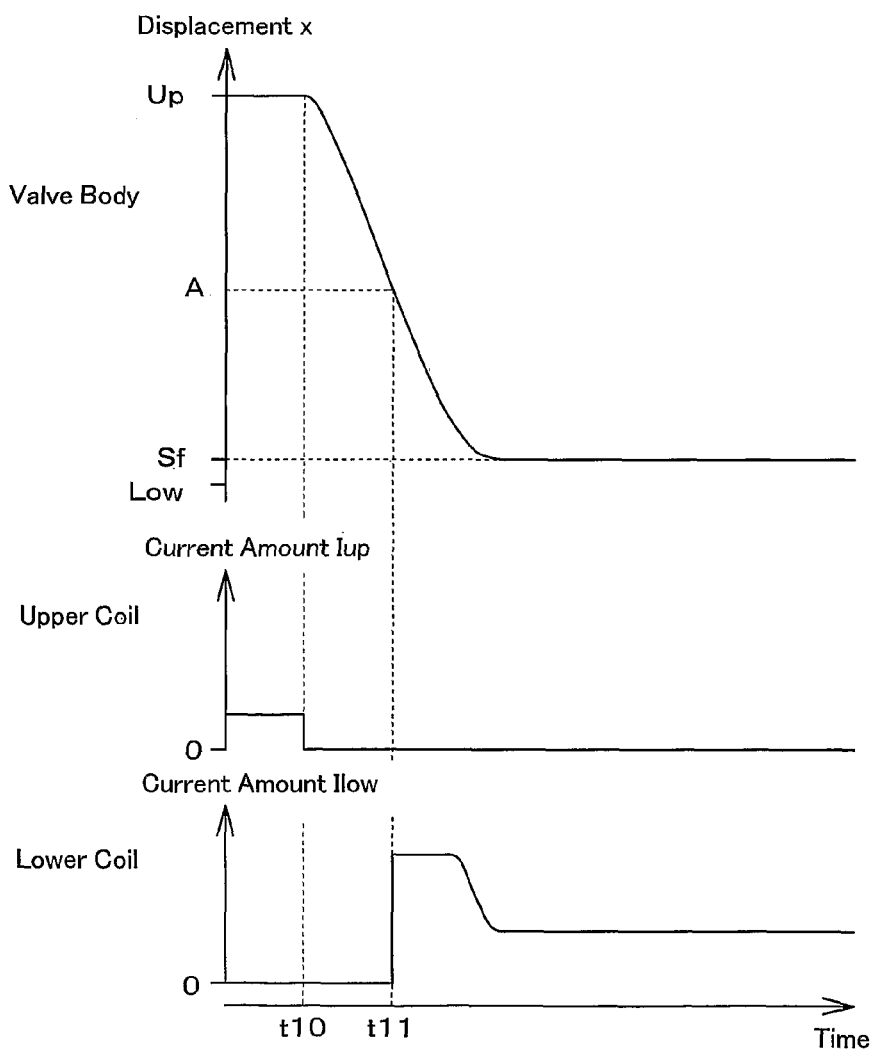
FIG. 15 is a timing chart showing an example of a control in accordance with the first embodiment.

Accordingly, as shown by a timing chart in FIG. 15, the attraction current application to the lower coil 10a is started at the attraction current application start displacement A set on the basis of the cylinder internal pressure external force Fcl and the neutral position deviation Dmp (t11), after the holding current applied to the upper coil 12a is stopped (t10 and after). FIG. 15 shows a state in which the holding current applied to the lower coil 10a is controlled in such a manner as to float to the target floating position Sf at a time of opening the valve.

In the structure mentioned above, the correspondence to claims is as follows. A combination of the poppet valve 6 and the armature 8 corresponds to a valve body (a controlled object). The cylinder internal pressure sensor 2b, the port pressure sensor 2c, and the ECU 2 for calculating the cylinder internal pressure external force Fcl on the basis of the cylinder internal pressure Pcl and the port pressure Ppt detected by these sensors 2b and 2c correspond to a disturbance detecting section. The fully closed position measuring process (FIG. 7), the fully open position measuring process (FIG. 8), the neutral position measuring process (FIG. 9), the neutral position deviation amount calculating process per engine stop (FIG. 11) and the long-cycle neutral position deviation amount averaging process (FIG. 13) correspond to processes performed by a change with time detecting section. The steps S100 and S102 in the valve opening control process (FIG. 5) correspond to processes performed by an operation switching point changing section.

In accordance with the first embodiment described above, the following advantages can be obtained.

(1) Due to influence of both of the cylinder internal pressure external force Fcl corresponding to the disturbance and the change with time of the springs 14 and 16 corresponding to the elastic member, the attraction current application start displacement A is deviated from the proper displacement in the sliding mode control. There is a risk that the process (FIG. 5: S104 to S116) in the sliding mode control becomes unstable.

Accordingly, in the valve opening control process (FIG. 5), the proper attraction current application start displacement A is set by changing the attraction current application start displacement A (S100) corresponding to the operation switching point in correspondence to both of the cylinder internal pressure external force Fcl and the neutral position deviation amount Dmp of the poppet valve 6 by springs 14 and 16. Accordingly, it is possible to prevent the destabilization in the sliding mode control, and it is possible to prevent a deterioration of the seating speed and a loss of synchronism.

(2) The detected value (the detected voltage V) of the lift sensor 18 is not used as the displacement of the poppet valve 6, but the detected voltage V is converted into the actual displacement x on the basis of the relationship f shown in FIG. 12. Accordingly, it is possible to do away with the displacement error on the basis of the straight-line relationship between the detected voltage V and the actual displacement x, and it is possible to detect the change with time of the neutral position more accurately.

Accordingly, it is possible to set the more proper attraction current application start displacement A, and it is possible to prevent the destabilization in the sliding mode control.

Second Embodiment

Figure 16:
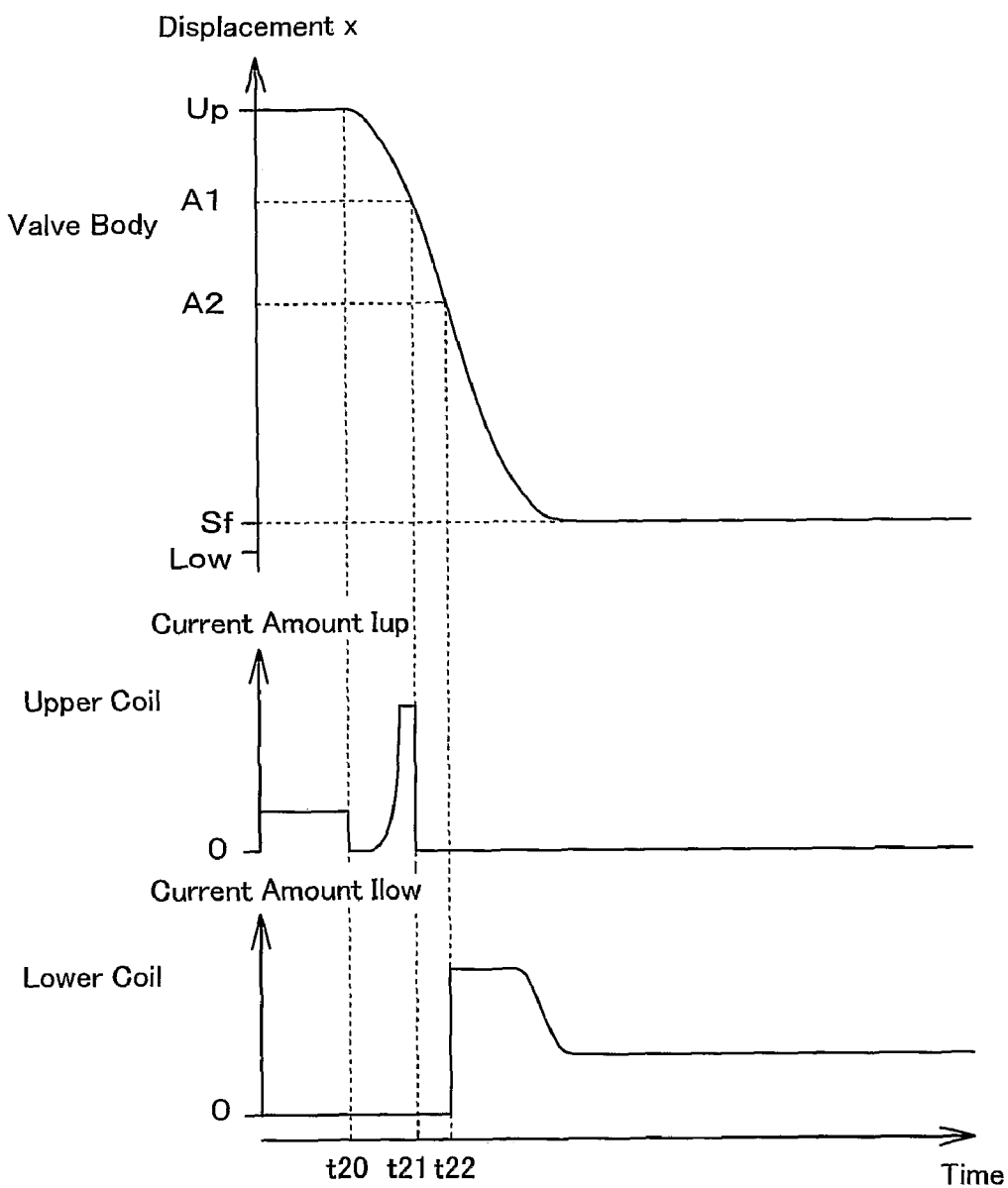
FIG. 16 is a timing chart showing an example of a control in accordance with a second embodiment.

In the present embodiment, as shown by a timing chart in FIG. 16, after the holding current in the upper coil 12a is temporarily stopped in accordance with the valve opening control process (t20 and after), a motion of the valve body constituted by the poppet valve 6 and the armature 8 is temporarily controlled by the brake current. Further, after finishing the brake current application (t21 and after), the attraction current application start is applied to the lower coil 10a (t22).

Accordingly, in the present embodiment, the operation switching point is constituted by both of the brake current application end displacement A1 and the attraction current application start displacement A2.

Figure 17:
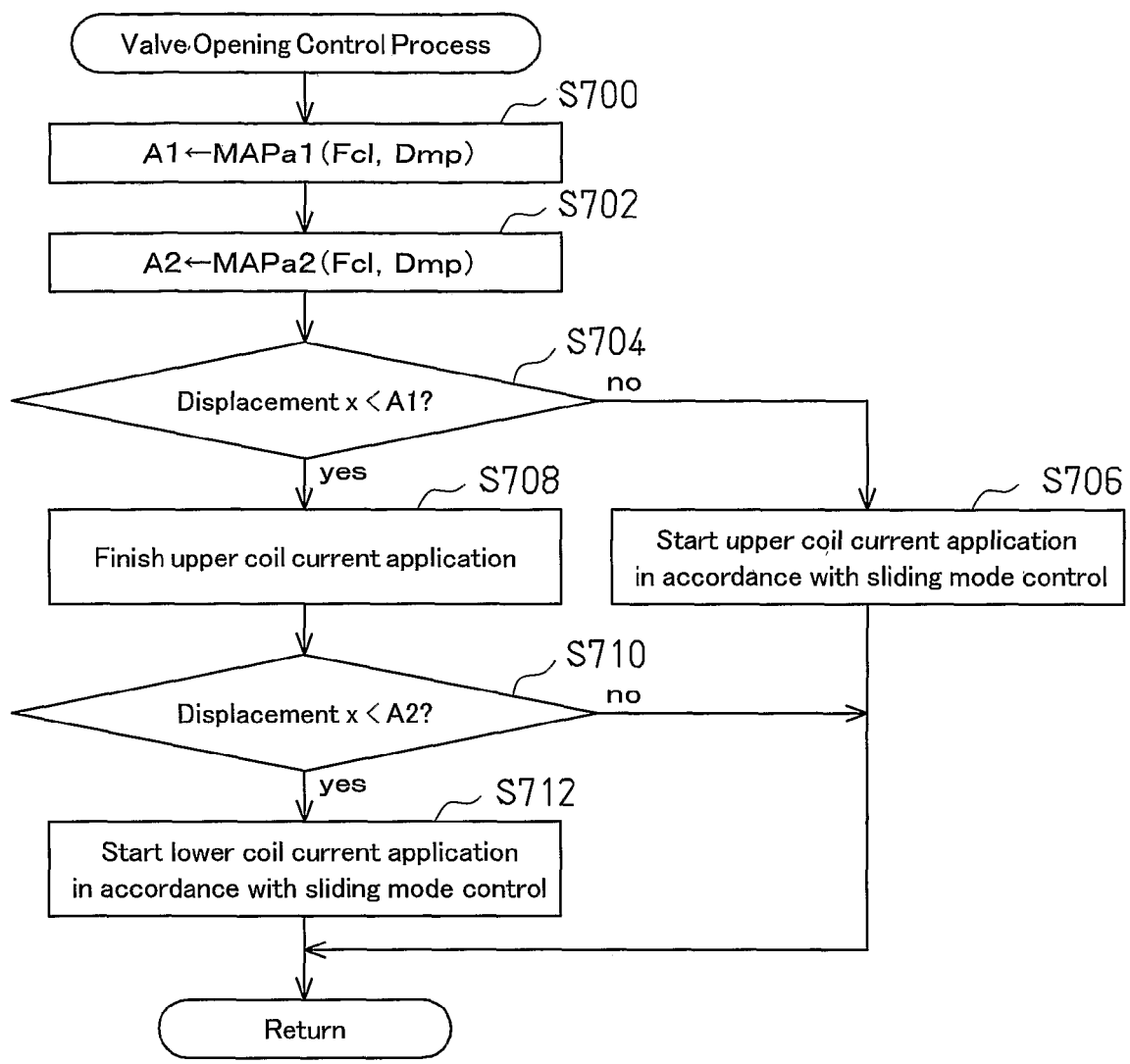
FIG. 17 is a flowchart of a valve opening control process executed by the ECU in accordance with the second embodiment.

Accordingly, in the present embodiment, the valve opening control process is repeated in a time cycle as shown in FIG. 17 in place of the process in FIG. 5. The other structures are the same as the structures in accordance with the first embodiment. Accordingly, a description will be given with reference to the other drawings than FIGS. 5 and 15 of the first embodiment in addition to the new drawings.

If the present process is started, the setting of the brake current application end displacement A1 is first executed (S700). The brake current application end displacement A1 corresponds to a threshold value for judging the displacement stopping the brake force applied to the armature 8 which is going to be disconnected from the upper core 12, on the sliding mode control.

A proper value of the brake current application end displacement A1 is changed by the cylinder internal pressure external force Fcl corresponding to the disturbance and the neutral position deviation Dmp corresponding to the change with time. Accordingly, the brake current application end displacement A1 is calculated on the basis of the cylinder internal pressure external force Fcl and the neutral position deviation Dmp in accordance with a map MAPa1 shown in FIG. 18, in the step S700. Each of the values of the cylinder internal pressure external force Fcl and the neutral position deviation Dmp is obtained in the same manner as the first embodiment mentioned above.

In the map MAPa1 (FIG. 18), since the brake force is likely to be applied by the cylinder internal pressure external force Fcl at a time of opening the valve in accordance with the increase of the cylinder internal pressure external force Fcl, it is necessary to finish the brake current in an early stage. Accordingly, the brake current application end displacement A1 is moved to the valve closing side in accordance with the increase of the cylinder internal pressure external force Fcl. Further, if the neutral position deviation comes close to the valve closing side, the brake current application end displacement A1 is moved to the valve closing side so as to adapt thereto, and if the neutral position deviation comes close to the valve opening side, the brake current application end displacement A1 is moved to the valve opening side so as to adapt thereto.

Figure 18:
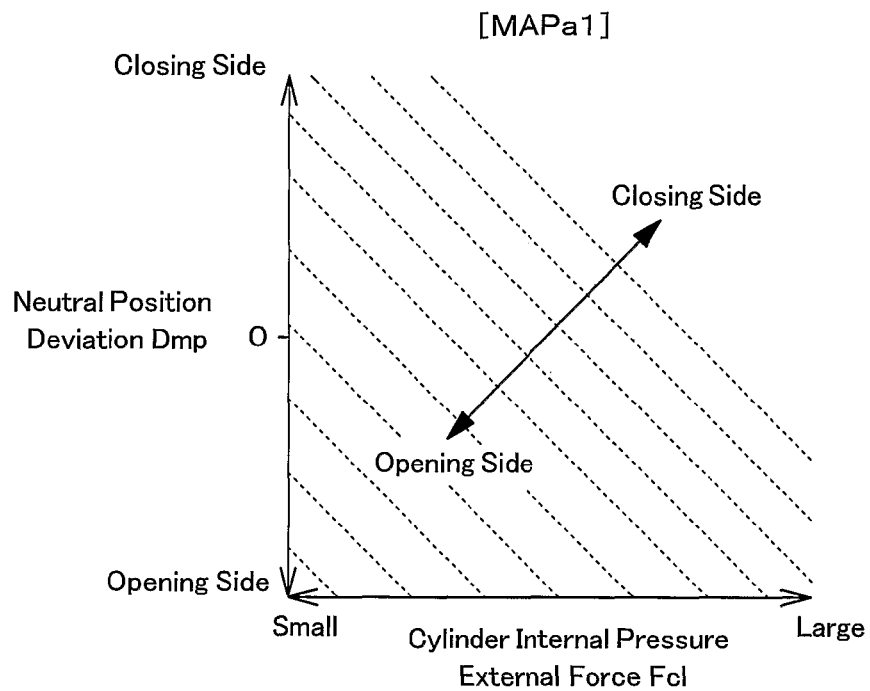
FIG. 18 is an explanatory view of a structure of a map MAPa1 for calculating a brake current application end displacement A1 in the second embodiment.

In this case, since the brake force is hard to be applied at a time of the valve closing control due to the cylinder internal pressure external force Fcl, it is necessary to delay the end of the brake current. Accordingly, a map having the same tendency as that of the map MAPa1 in FIG. 18 is employed, however, the map value is different.

Next, the attraction current application start displacement A2 is set (S702). In this case, a relationship A2<A1 is established. The attraction current application start displacement A2 corresponds to a threshold value for judging the displacement starting the attraction force applied to the armature 8 which is going to be disconnected from the upper core 12, on the sliding mode, which has the same tendency as that of the attraction current application start displacement A in the first embodiment.

Figure 6:
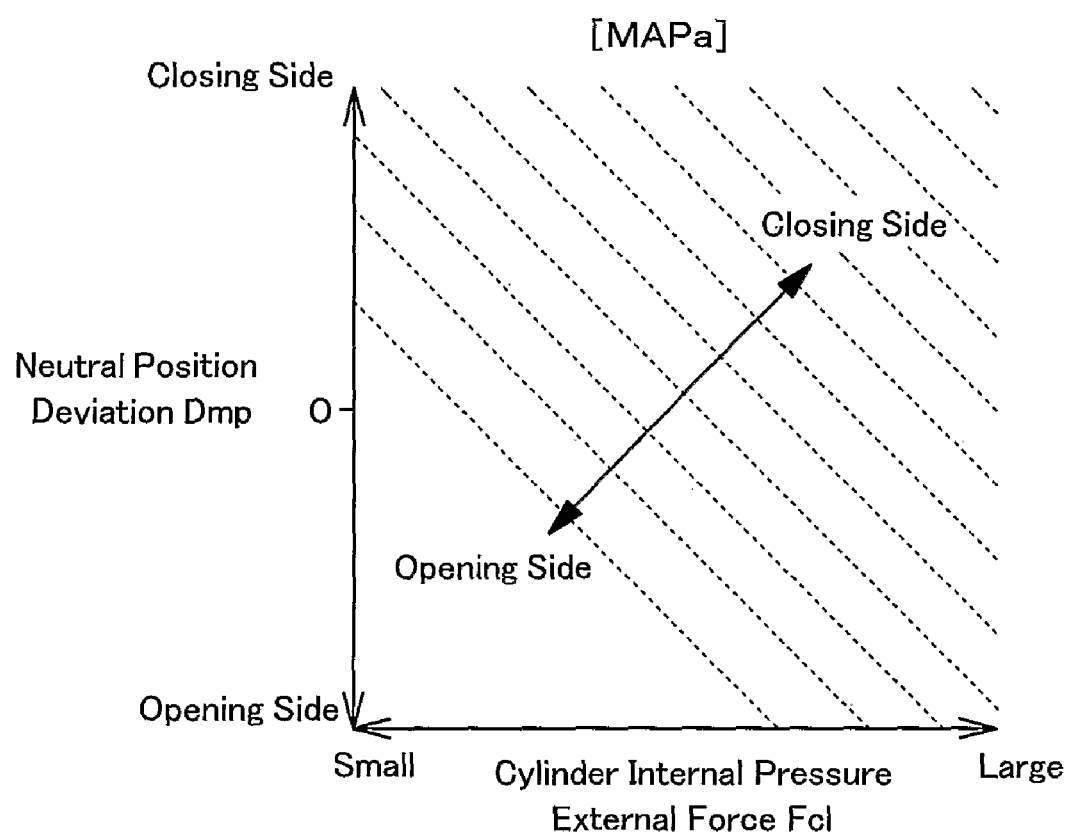
FIG. 6 is an explanatory view of a structure of a map MAPa for calculating an attraction current application start displacement A in the first embodiment.
Figure 19:
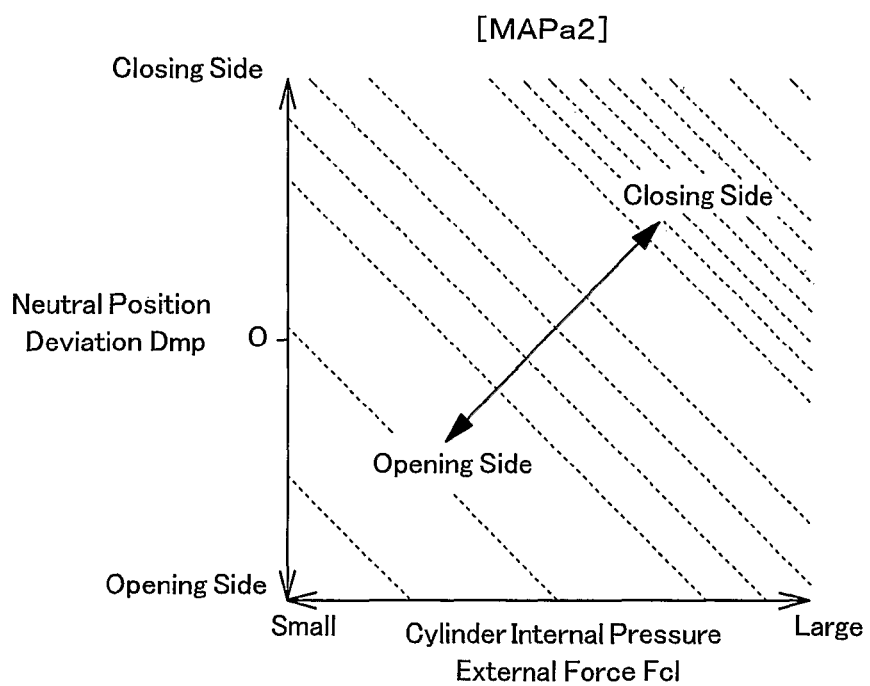
FIG. 19 is an explanatory view of a structure of a map MAPa2 for calculating an attraction current application start displacement A2 in the second embodiment.

Accordingly, a map MAPa2 shown in FIG. 19 having the same tendency as that of the map MAPa shown in FIG. 6 is employed. In other words, in the map MAPa2 (FIG. 19), since it is necessary to supply the attraction current in an early stage against the cylinder internal pressure external force Fcl at a time of opening the valve in accordance with the increase of the cylinder internal pressure external force Fcl, the attraction current application start displacement A2 is moved to the valve closing side in accordance with the increase of the cylinder internal pressure external force Fcl. Further, if the neutral position deviation comes close to the valve closing side, the attraction current application start displacement A2 is moved to the valve closing side so as to adapt thereto, and if the neutral position deviation comes close to the valve opening side, the attraction current application start displacement A2 is moved to the valve opening side so as to adapt thereto.

In this case, at a time of the valve closing control, a map having the same tendency as that of the map MAPa2 (FIG. 19) is employed, however, a relationship A2>A1 is established.

If the brake current application end displacement A1 and the attraction current application start displacement A2 are set, it is judged whether or not the displacement x of the poppet valve 6 detected by the lift sensor 18 is below the brake current application end displacement A1 (S704). In this case, if it is just after the valve opening control, and a relationship x≧A1 is established (no in S704), the current application start to the upper coil 12a in accordance with the sliding mode control is executed (S706). Accordingly, the current application for the braking force is executed to the upper coil 12a from the timing t20 in FIG. 16.

In other words, in this timing, the calculation of the control current Iup applied to the upper coil 12a is executed by providing the ECU 2 with the function for storing the physical model formula defining the current amount applied to the upper coil 12a on the basis of the gap Gp and the control input U in the ECU 2, in accordance with the sliding mode control described in the first embodiment mentioned above. Further, the map defining the relationship among the gap Gp, the control input U and the supply current amount to the upper coil 12a may be stored in the ECU 2. In this case, if the control input U is negative, the current application control amount is set to "0".

Thereafter, as far as the relationship x≧A1 is established (no in S704), the braking force on the basis of the electromagnetic force of the upper core 12 is applied to the armature 8 in the sliding mode control.

Further, if the relationship x<A1 is established on the basis of the movement of the armature 8 (yes in S704), the current application to the upper coil 12a is finished (S798: timing t21 in FIG. 16).

Next, it is judged whether or hot the displacement x is below the attraction current application start displacement A2 (S710). In this case, if a relationship x≧A2 is established (no in S710), the present process is temporarily finished. Thereafter, as far as the relationship x≧A2 is established (no in S710), the armature 8 and the poppet valve 6 are moved to the valve opening side on the basis of the urging force of the upper spring 16 without current application to the upper coil 12a and the lower coil 10a.

Further, if the relationship x<A2 is established (yes in S710), the current application start to the lower coil 10a is executed in accordance with the sliding mode control (S712: timing t22 in FIG. 16). The contents correspond to the description of the first embodiment (FIG. 5: S104 to S116).

In the structure mentioned above, the correspondence to claims is as follows. A combination of the poppet valve 6 and the armature 8 corresponds to a valve body (a controlled object). The cylinder internal pressure sensor 2b, the port pressure sensor 2c, and the ECU 2 for calculating the cylinder internal pressure external force Fcl on the basis of the cylinder internal pressure Pcl and the port pressure Pbt detected by these sensors 2b and 2c correspond to a disturbance detecting section. The fully closed position measuring process (FIG. 7), the fully open position measuring process (FIG. 8), the neutral position measuring process (FIG. 9), the neutral position deviation amount calculating process per engine stop (FIG. 11) and the long-cycle neutral position deviation amount averaging process (FIG. 13) correspond to processes performed by a change with time detecting section. The steps S700 to S704 and S710 in the valve opening control process (FIG. 17) correspond to processes performed by an operation switching point changing section.

In accordance with the second embodiment described above, the following advantages are obtained.

In addition to the effects (1) and (2) of the first embodiment mentioned above, the following advantages are generated.

In the sliding mode control applying the brake current together with the attraction current, the deviation from the proper displacement is generated about the brake current application end displacement A1 due to both of the cylinder internal pressure external force Fcl and the change with time of the springs 14 and 16.

Accordingly, in the valve opening control process (FIG. 17), the proper brake current application end displacement A1 and the attraction current application start displacement A2 are set by changing the brake current application end displacement A1 together with the attraction current application start displacement A2 in correspondence to both of the cylinder internal pressure external force Fcl and the neutral position deviation amount Dmp caused by the springs 14 and 16. Accordingly, it is possible to prevent the destabilization in the sliding mode control.

Third Embodiment

In the sliding mode control in accordance with the first and second embodiments mentioned above, as shown in each of the FIGS. 15 and 16, the holding current applied to the lower coil 10a is controlled in such a manner as to float the armature 8 to a target floating position Sf in place of bringing the armature 8 into contact with the lower core 10 at a time of the valve opening control.

In the target floating position Sf, the proper value is changed by the cylinder internal pressure external force Fcl and the neutral position deviation Dmp. In the present embodiment, the target floating position Sf is changed in correspondence to the cylinder internal pressure external force Fcl and the neutral position deviation Dmp in accordance with a target floating position setting process shown in FIG. 20. The other structures are the same as those of the first or second embodiment. Accordingly, a description will be given with reference to the drawings in each of the embodiment in addition to the new drawings.

Figure 20:
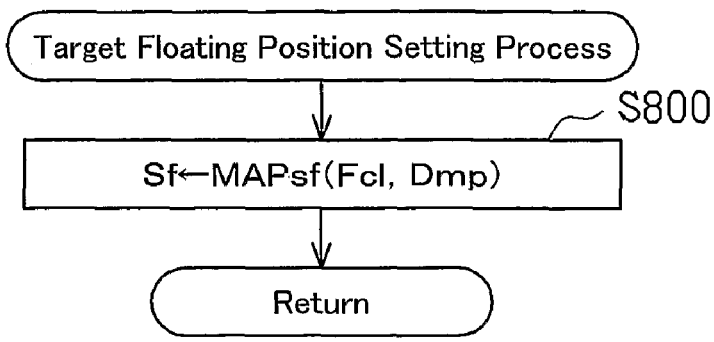
FIG. 20 is a flowchart of a target floating position setting process executed by an ECU in accordance with a third embodiment.

A description will be given of the target floating position setting process (FIG. 20). The present process corresponds to a process executed just before the valve opening control process (FIG. 5 or 17). In the present process, the target floating position Sf is calculated on the basis of the cylinder internal pressure external force Fcl corresponding to the disturbance and the neutral position deviation Dmp corresponding to the change with time, in accordance with a map MAPsf (S800). In this case, each of the values of the cylinder internal pressure external force Fcl and the neutral position deviation Dmp are obtained in the same manner as the first embodiment mentioned above.

Figure 21:
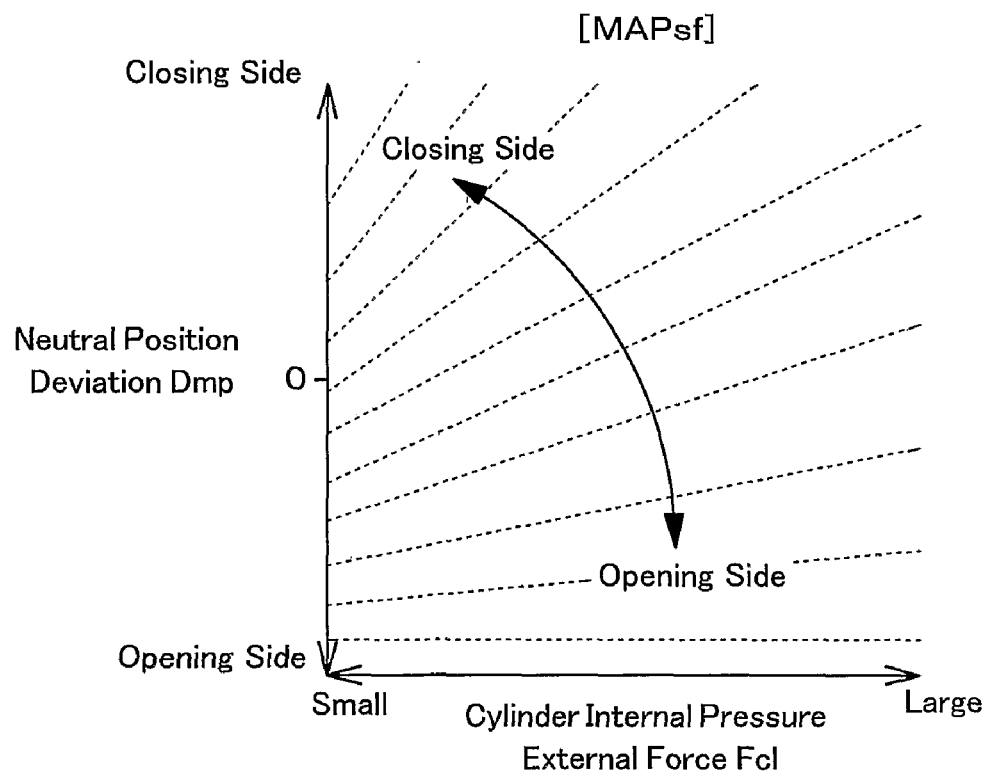
FIG. 21 is an explanatory view of a structure of a map MAPsf for calculating a target floating position Sf in the third embodiment.

The map MAPsf is shown in FIG. 21. In this map MAPsf, since the armature 8 is hard to come into collision with the lower core 10 in accordance with the increase of the cylinder internal pressure external force Fcl, the target floating position Sf is moved close to the valve opening side.

If the neutral position deviation comes to the valve closing side, the target floating position Sf is moved to the valve closing side so as to adapt thereto, and if the neutral position deviation Dmp comes to the valve opening side, the target floating position Sf is moved to the valve opening side so as to adapt thereto.

Accordingly, in the valve opening control process (FIG. 5 or 17), the target floating position Sf is changed in correspondence to the cylinder internal pressure external force Fcl and the neutral position deviation Dmp in the sliding mode control applied to the lower coil 10a executed for holding to the opening state.

In the structure mentioned above, the correspondence to claims is as follows. A combination of the poppet valve 6 and the armature 8 corresponds to a valve body (a controlled object). The cylinder internal pressure sensor 2b, the port pressure sensor 2c, and the ECU 2 for calculating the cylinder infernal pressure external force Fcl on the basis of the cylinder internal pressure Pcl and the port pressure Pbt detected by these sensors 2b and 2c correspond to a disturbance detecting section. The fully closed position measuring process (FIG. 7), the fully open position measuring process (FIG. 8), the neutral position measuring process (FIG. 9), the neutral position deviation amount calculating process per engine stop (FIG. 11) and the long-cycle neutral position deviation amount averaging process (FIG. 13) correspond to processes performed by a change with time detecting section. The target floating position setting process (FIG. 20) corresponds to a process performed by a target floating position changing section.

In accordance with the present third embodiment described above, the following advantages are obtained.

(1) Since the target floating position Sf is set to the proper position in correspondence to the disturbance and the change with time as well as the effects of the first or second embodiment mentioned above are generated, it is possible to prevent the destabilization in the sliding mode control and it is possible to improve the seating speed in the valve opening side.

Fourth Embodiment

The present embodiment is different from the first to third embodiments mentioned above in a point that a process of preparing and correcting the relationship between the displacement x and the lift sensor detected voltage V expressed by the map shown in FIG. 12, the function or the like is executed, and the other structures are the same as any one of the first to third embodiments. Accordingly, a description will be given with reference to the drawings in the first to third embodiments in addition to the new drawings.

Figure 22:
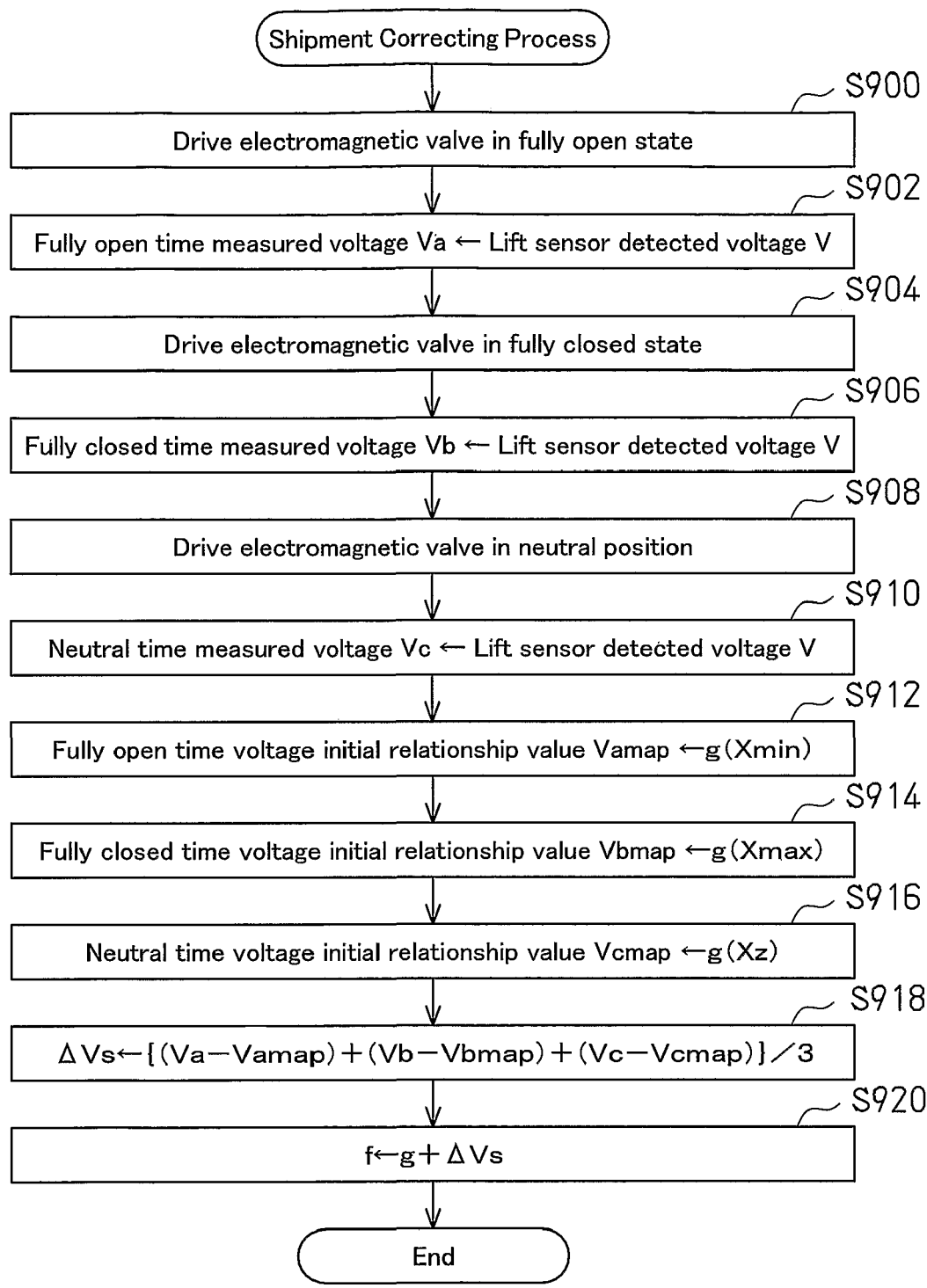
FIG. 22 is a flowchart of a shipment correcting process executed by a measuring computer in a fourth embodiment.
Figure 24:
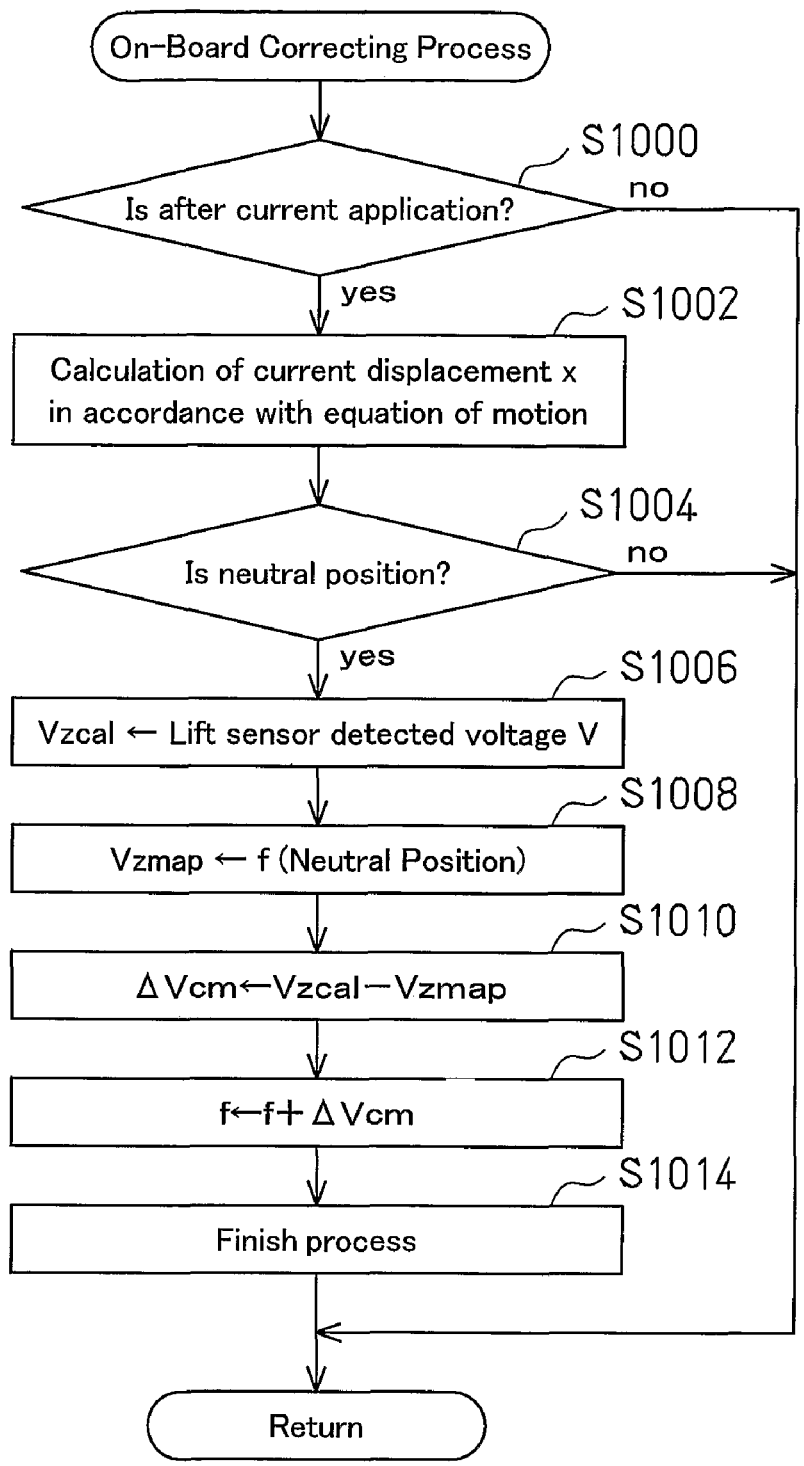
FIG. 24 is a flowchart of an on-board correcting process executed by the ECU in the fourth embodiment.

There are executed a shipment correcting process as shown in FIG. 22 as the preparing process of the relationship f, and an on-board correcting process as shown in FIG. 24 as the correcting process of the relationship f.

A description will be given of the shipment correcting process (FIG. 22). The present process is executed by a measuring computer at a time of finishing the assembly of the electromagnetic valve 4. Alternatively, it is executed by the measuring computer at a time of installing the electromagnetic valve 4 in the internal combustion engine. In addition, it may be executed by the ECU 2 for control at a time of installing the electromagnetic valve 4 in the internal combustion engine. In the case of being corrected by the measuring computer, the corrected value is written as a corrected value in the non-volatile memory of the ECU 2. In the present embodiment, the process is executed by the measuring computer provided in a measuring instrument in which the electromagnetic valve 4 is set after the assembly of the electromagnetic valve 4 is finished.

In this case, it is assumed that an adjustment of setting it at a proper neutral position with respect to the electromagnetic valve 4 as a hardware is finished in the final step of the assembling stage before being set to the measuring instrument.

If the shipment correcting process (FIG. 22) is executed, the measuring computer first applies the current to the lower coil 10a of the electromagnetic valve 4 by the drive apparatus provided in the measuring instrument, and moves the poppet valve 6 and the armature 8 to the fully open position (the displacement Xmin) (S900). Further, the detected voltage V of the lift sensor 18 in the fully open state is stored in the fully open time measuring voltage Va (S902).

Next, the current application to the lower coil 10a is stopped, the current is applied to the upper coil 12a, and the poppet valve 6 and the armature 8 are moved to the fully closed position (the displacement Xmax) (S904). Further, the detected voltage V of the lift sensor 18 in the fully closed state is stored as the fully closed time measured voltage Vb (S906).

Next, the poppet valve 6 and the armature 8 are moved to the neutral position (the displacement Xz) by stopping the current application to the upper coil 12a, that is, stopping the current application to both the coils 10a and 12a (S908). Further, the detected voltage V of the lift sensor 18 in the neutral position state is stored as the neutral time measured voltage Vc (S910). In this neutral position measurement (S908, S910), the neutral time measured voltage Vc may be determined as the moving average value by executing the steps S400 to S418 of the neutral position measuring process (FIG. 9) executed in the first embodiment mentioned above. Further, the neutral time measured voltage Vc may be determined by averaging the detected voltage V of the lift sensor 18 in the neutral position state obtained by executing both of the movement from the fully closed position to the neutral position and the movement from the fully open position to the neutral position at plural times, or moving averaging them.

Figure 23:
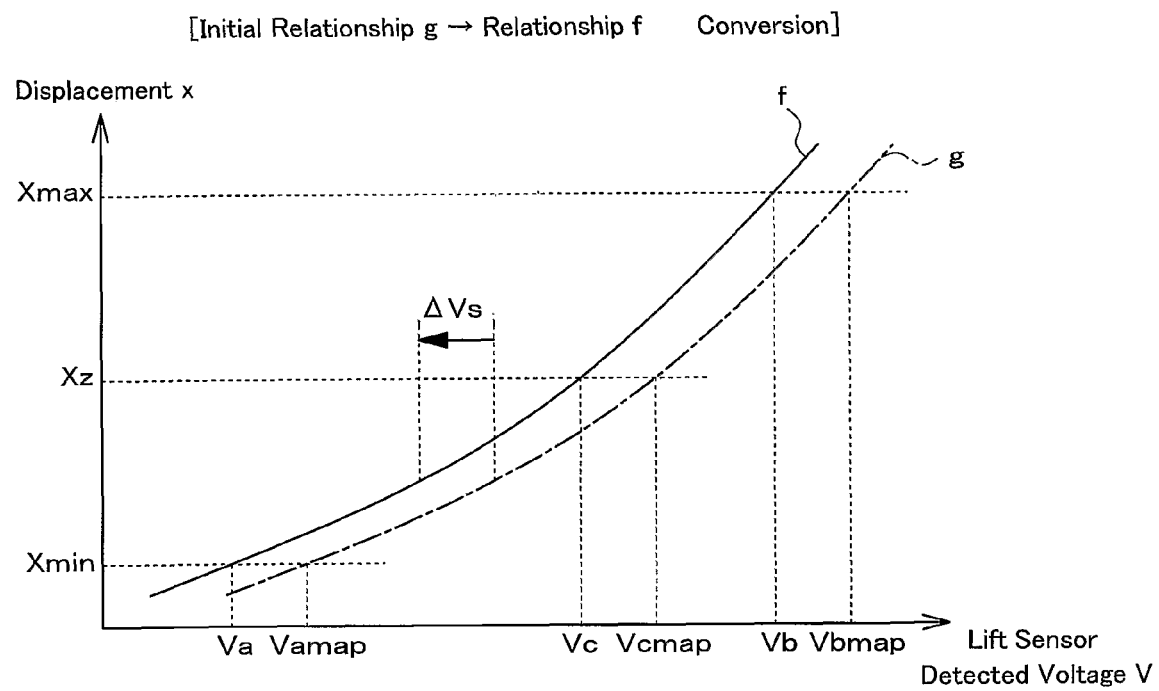
FIG. 23 is an explanatory view of a process for preparing a relationship f executed in the fourth embodiment.

Next, a fully open time voltage initial relationship value Vamap is calculated on the basis of the value of the fully open position (the displacement Xmin) determined on design or obtained by actual measurement from an initial relationship g expressing a relationship between the displacement x and the detected voltage V previously stored within the measuring computer as an initial map or an initial function and shown in FIG. 23 (S912).

A fully closed time voltage initial relationship value Vbmap is calculated on the basis of the value of the fully closed position (the displacement Xmax) from the initial relationship g in the same manner (S914). Further, a neutral time voltage initial relationship value Vcmap is calculated on the basis of the value of the neutral position (the displacement Xz) from the relationship g (S916).

Further, a deviation of the voltage between the actually measured value and the initial relationship value is calculated so as to be averaged as shown by an expression 15 at the fully open position, the fully closed position and the neutral position, and is calculated as an average deviation amount ΔVs (S918).

$$\Delta Vs \leftarrow \{(Va-Va\text{map})+(Vb-Vb\text{map})+(Vc-Vc\text{map})\}/3 \quad \text{[Expression 15]}$$

Next, the value of the initial relationship g previously stored within the measuring computer and shown in FIG. 23 is corrected by the average deviation amount ΔVs, that is, the initial relationship g is offset at the average deviation amount ΔVs, whereby the relationship f is prepared and is stored in the memory for the ECU 2 (S920).

The relationship f prepared as mentioned above is used as the relationship f described by FIG. 12 in the first embodiment mentioned above.

A flowchart in FIG. 24 shows an on-board correcting process executed by the ECU 2 for correcting the relationship f with respect to the electromagnetic valve 4 after being installed in the internal combustion engine. The present process corresponds to a process which is repeatedly executed in a short time cycle.

If the present process is started, it is judged whether or not the current application to both the coils 10a and 12a of the electromagnetic valve 4 is stopped for stopping the operation of the internal combustion engine (S1000). In the case that the electric current application is not stopped (no in S1000), the present process is temporarily finished.

If the current application is stopped (yes in S1000), the current displacement x is calculated in accordance with the equation of motion of the poppet valve 6 and the armature 8 corresponding to the controlled object (S1002).

In the sliding mode control executed by the ECU 2 described in the first embodiment mentioned above, the expression 4 can be expressed by an expression 16 in a state which the electromagnetic force is not applied.

$$\ddot{x} = \frac{K}{M} \cdot x - \frac{C}{M} \cdot \dot{x} - \frac{F}{M} \quad \text{[Expression 16]}$$

After calculating the current displacement x from the equation of motion, it is judged whether or not the calculated displacement x corresponds to the neutral position (S1004). If it does not correspond to the neutral position (no in S1004), the present process is temporarily finished. The process in the step S1002 is repeated until the displacement x calculated from the equation of motion mentioned above comes to the neutral position (no in S1004).

If the displacement x comes to thee neutral position (yes in S1004), the detected voltage V of the lift sensor 18 in this timing is set to a calculation neutral position voltage Vzcal (S1006).

Next, a relationship neutral position voltage Vzmap at the neutral position is calculated on the basis of the relationship f stored in the memory of the ECU 2 (S1008).

Further, a calculation map deviation amount ΔVcm is calculated in accordance with an expression 17 (S1010).

$$\Delta Vcm \leftarrow Vz\text{cal} - Vz\text{map} \quad \text{[Expression 17]}$$

Figure 25:
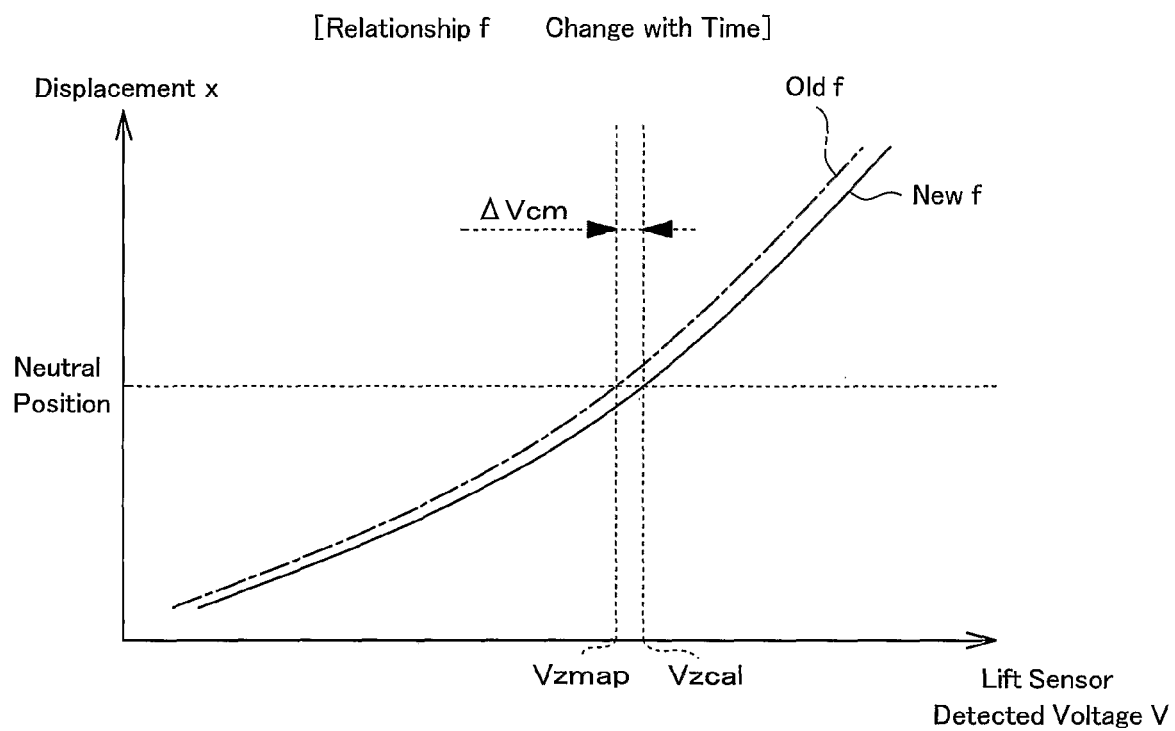
FIG. 25 is an explanatory view of a process for updating the relationship f executed in the fourth embodiment.

Further, the relationship f is updated by the calculation map deviation amount ΔVcm (S1012). In other words, a new relationship f is set by executing an offset moving the original relationship f in the voltage direction as shown in FIG. 25 at an amount of the calculation map deviation amount ΔVcm. Accordingly, the relationship f is changed in correspondence to the case that the change with time is generated in the electromagnetic valve 4 after being installed in the internal combustion engine.

In the structure mentioned above, the correspondence to claims is as follows. In addition to the relations mentioned in each of the embodiments, each of the shipment correcting process (FIG. 22) and the on-board correcting process (FIG. 24) corresponds to an adjusting method of the sliding mode control apparatus.

In accordance with the fourth embodiment mentioned above, the following advantages are obtained.

(1) It is possible to obtain the advantages of any one of the first to third embodiments to which the present embodiment is applied.

(2) In the shipment correcting process (FIG. 22), the measured voltages Va, Vb and Vc are obtained by the lift sensor 18 in the state in which the poppet valve 6 is positioned at the known displacement (the fully open state, the fully closed state and the neutral position) (S900 to S910). Further, the initial relationship values Vamap, Vbmap and Vcmap are determined by converting the respective known displacements by the initial relationship g (S912 to S916).

Further, the average deviation amount ΔVs is calculated as the corrected value on the basis of the difference between the measured voltages Va, Vb and Vc and the initial relationship values Vamp, Vbmap and Vcmap (S918), and the relationship f used for the actual sliding mode control is determined by correcting the initial relationship g by the average deviation amount ΔVs (S920).

It is possible to set the relationship f expressing the detected voltage of the lift sensor 18 and the displacement of the poppet valve 6 accurately by determining two detected voltages on the basis of the respective known displacements and correcting the initial relationship g on the basis of the differences.

Accordingly, it is possible to prevent the destabilization in the sliding mode control in accordance with the machine error of the electromagnetic valve 4.

(3) Since the on-board correcting process (FIG. 24) exists, it is possible to obtain the detected voltage Vzcal in the specific displacement state (the neutral position in this case) of the poppet valve 6 in accordance with the equation of motion in the ECU 2 without using the measuring instrument, even after the electromagnetic valve 4 is installed in the internal combustion engine (S1002, S1004 and S1006). Further, it is possible to obtain the detected voltage Vzmap of the lift sensor 18 by converting the specific displacement in accordance with the relationship f mentioned above (S1008). It is possible to update the relationship f in such a manner as to accurately express the detected voltage of the lift sensor 18 and the displacement of the poppet valve 6 by correcting the relationship f on the basis of the difference ΔV cm (S1010) between two detected voltages determined as mentioned above (S1012). Accordingly, it is possible to prevent the destabilization in the sliding mode control in accordance with the machine error of the electromagnetic valve 4.

Therefore, even if the change with time is generated and the actual relationship between the detected voltage of the lift sensor 18 and the displacement of the poppet valve 6 is changed, it is possible to return the relationship f to the accurate state by correcting as mentioned above. Accordingly, it is possible to prevent the destabilization in the sliding mode control in accordance with the change with time of the electromagnetic valve 4.

Particularly, just after stopping the operation of the internal combustion engine, there is employed the equation of motion in the case that both the coils 10a and 12a of the electromagnetic valve 4 do not generate the electromagnetic force, but the poppet valve 6 and the armature 8 are operated only by the springs 14 and 16. Under the circumstance mentioned above, there are not much factors causing the disturbance at a time of obtaining the data for correcting the relationship f, and it is possible to correct more accurately.

(4) Even if the on-board correcting process (FIG. 24) does not exist in the ECU 2, it is possible to cope even with the change with time by the shipment correcting process (FIG. 22), in the case that the electromagnetic valve 4 is detached from the internal combustion engine and is set to the measuring instrument.

In other words, it is possible to return the relationship f to the accurate state by detaching the electromagnetic valve 4 from the internal combustion engine and attaching to the measuring instrument as mentioned above so as to measure, and correcting the map data within the ECU 2 so as to rewrite. Accordingly, it is possible to prevent the destabilization in the sliding mode control in accordance with the change with time of the electromagnetic valve 4.

Fifth Embodiment

The cylinder internal pressure external force Fcl in each of the embodiments is calculated by the pressure difference between the cylinder internal pressure Pcl detected by the cylinder internal pressure sensor 2b, and the port pressure Ppt detected by the port pressure sensor 2c. In place thereof, as in the present embodiment, the cylinder internal pressure external force Fcl is calculated in accordance with the physical equation without the cylinder internal pressure sensor 2b and the port pressure sensor 2c, thereby being used for the sliding mode control such as in each of the first to fourth embodiments.

Figure 26:
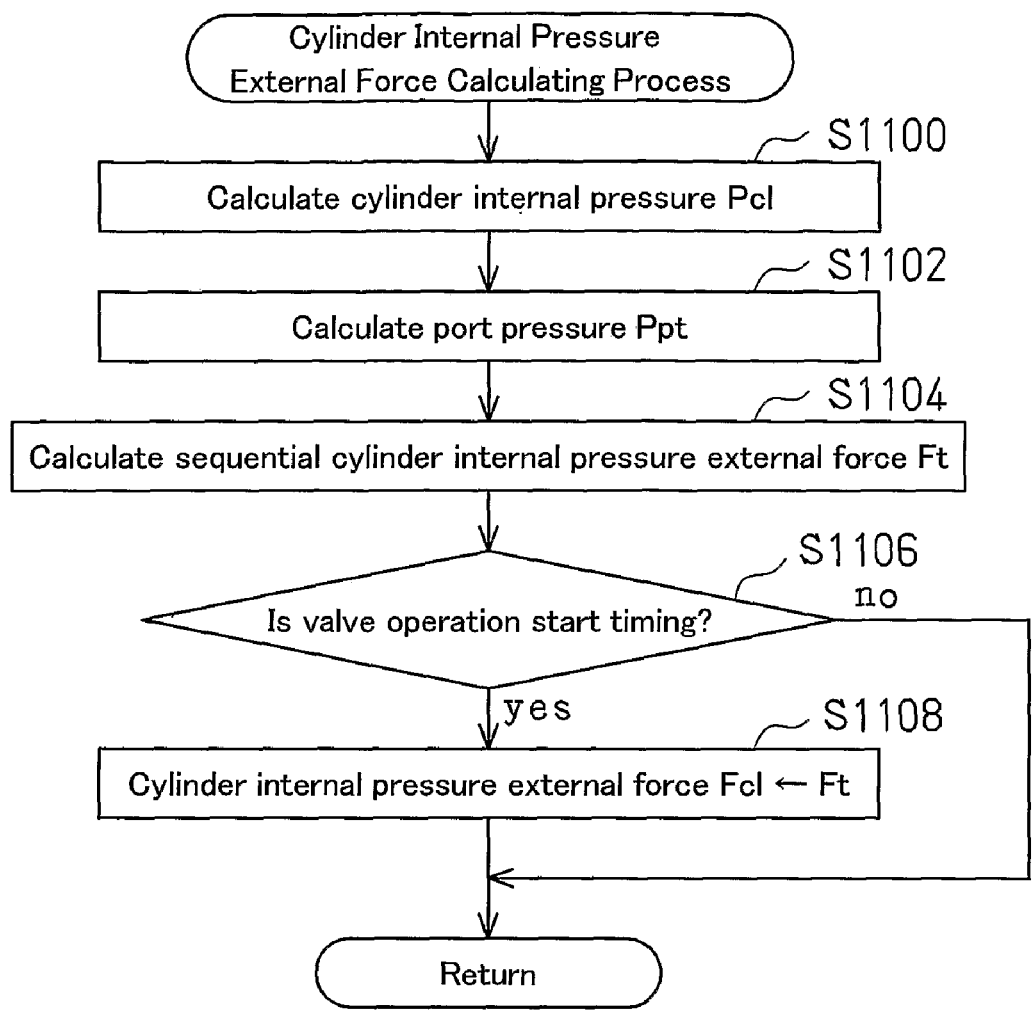
FIG. 26 is a flowchart of a cylinder internal pressure external force calculating process executed by an ECU in accordance with a fifth embodiment.

The cylinder internal pressure external force calculating process is shown in FIG. 26. The present process corresponds to a process which is repeatedly executed in a rotation cycle of a fixed crank angle (for example, a fixed crank angle between 3 degrees and 6 degrees) of the internal combustion engine. If the present process is started, the cylinder internal pressure Pcl is first calculated (S1100).

The cylinder internal pressure Pcl can be estimated in accordance with expressions 18 to 23 obtained by taking into consideration a heat insulation and a fuel heat generation model in the present embodiment. A cooling loss, a time loss and a pump loss are excluded, however, it is possible to calculate by taking each of the losses into consideration.

$$Pcl_n = \frac{Pcl_{n-1} \cdot Vcl_n + \Delta Q_n}{2Vcl_n - Vcl_{n-1}} \quad \text{[Expression 18]}$$

$$\frac{dQ}{Q} = dx \quad \text{[Expression 19]}$$

$$Q = H_u \cdot m_f \quad \text{[Expression 20]}$$

$$m_f = \frac{1}{AFR} \cdot Vall \cdot \frac{\eta_v}{100} \quad \text{[Expression 21]}$$

$$dx = \frac{a}{\Delta \alpha_c}(m+1) \cdot y^m \cdot \exp(-a \cdot y^{m+1}) \quad \text{[Expression 22]}$$

$$y = \frac{\alpha - \alpha_0}{\Delta \alpha_c} \quad \text{[Expression 23]}$$

Pcln corresponds to an estimated cylinder internal pressure [Pa] at the present sample time, and Pcln−1 corresponds to an estimated cylinder internal pressure [Pa] at the previous sample time. Vcln corresponds to a cylinder volumetric capacity at the present sample time [cubic meter], Vcln−1 corresponds to a cylinder volumetric capacity at the previous sample time [cubic meter], Vall corresponds to a total cylinder volumetric capacity [L], $\Delta Qn$ corresponds to a fuel heat generation amount at the present sample time [J], and Q corresponds to a total fuel heat generation amount [J]. dQ corresponds to a heat generation amount by a vibe model [J], dx corresponds to a heat generation rate obtained from the vibe model [1/deg], Hu corresponds to a low calorific power of the fuel [J/kg: about 44 MJ/kg in case of gasoline], mf corresponds to a fuel mass [kg], ηv corresponds to a volumetric efficiency, and AFR corresponds to an air-fuel ratio (about 14.5). a and m correspond to a shape parameter of the vibe, α corresponds to a crank angle, α0 corresponds to a combustion start crank angle, and $\Delta \alpha c$ corresponds to a combustion period. The shape parameters a and m of the vibe, the combustion start crank angle α0 and the combustion period $\Delta \alpha c$ are calculated by the map in accordance with the internal combustion engine rotating speed and the internal combustion engine load rate (or further including the air-fuel ratio).

The cylinder volumetric capacity Vcl (Vcln and Vcln−1) can be calculated by an expression 24.

$$Vcl = Abr \cdot ((l+r) \cdot \cos(\psi) - r \cdot \cos(\alpha+\psi) - l \cdot SQRT(1-(r/l \cdot \sin(\alpha+\psi)-e/l)^2)) + v_0 \quad \text{[Expression 24]}$$

r corresponds to a crank radius, l corresponds to a connecting rod length, e corresponds to a crank pin offset, Abr corresponds to a bore area, v0 corresponds to a combustion chamber volumetric capacity, and $\psi = \arcsin(e/(r+1))$.

Figure 27A:
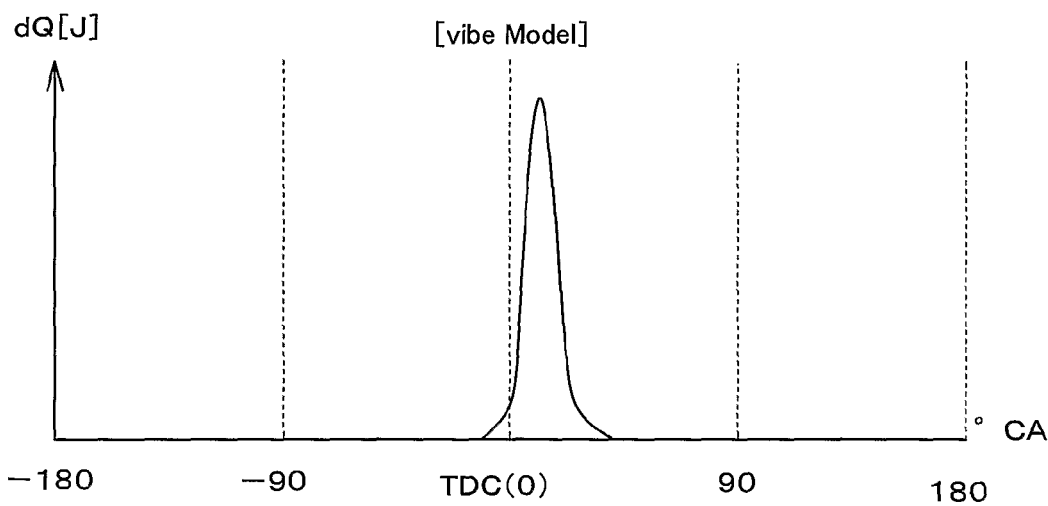
FIG. 27A is a graph showing a change of a heat generation amount dQ in the fifth embodiment.
Figure 27B:
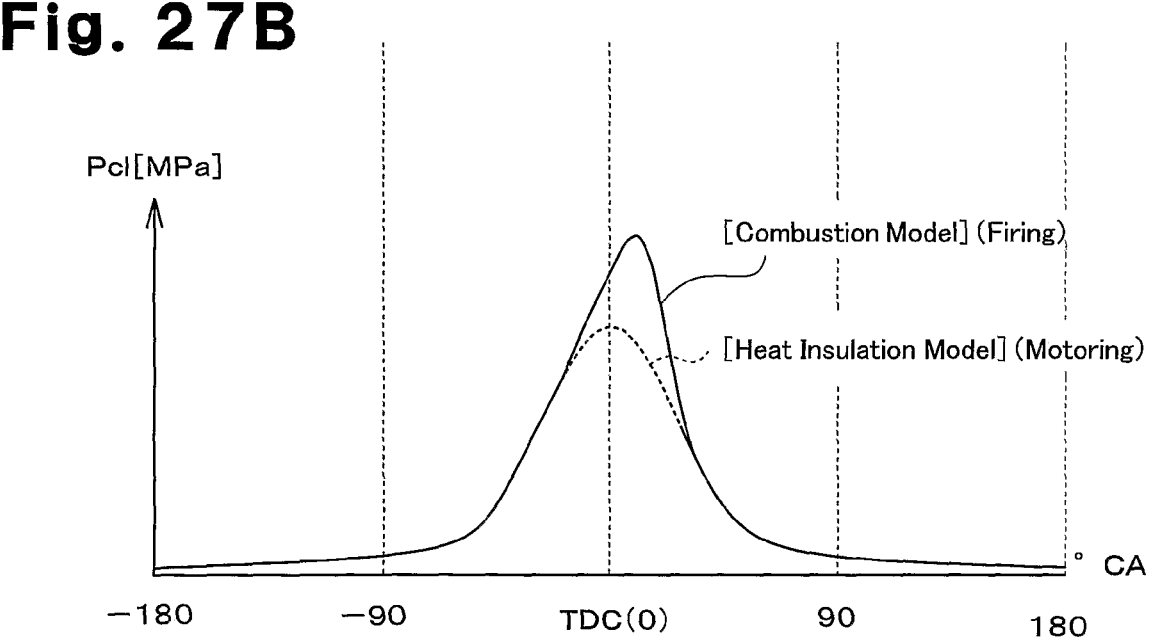
FIG. 27B is a graph showing a change of an estimated cylinder internal pressure Pcl calculated in the fifth embodiment.

In accordance with the calculation mentioned above, the cylinder internal pressure Pcl is calculated in correspondence to the crank angle (° CA) as shown in FIG. 27B. FIG. 27A shows a crank angle change of the heat generation amount dQ in accordance with the vibe model.

Next, the port pressure Ppt [Pa] is calculated (S1102). In the case of the exhaust port, it is calculated as shown by an expression 25 from the physical equation. In the case of the intake port, it is as shown by an expression 26.

$$Ppt = \left(100 + \frac{25Vall}{7000} \cdot N_e\right) / 1000 \quad \text{[Expression 25]}$$

$$Ppt = \eta_v / 1000 \quad \text{[Expression 26]}$$

Ne corresponds to an internal combustion engine rotating speed [rpm].

The cylinder internal pressure external force Ft is sequentially calculated as shown by an expression 27 on the basis of the cylinder internal pressure Pcl calculated as mentioned above (S1104).

$$Ft = (Pcl_n - Ppt)\frac{\pi d_v^2}{4} \quad \text{[Expression 27]}$$

$d_v$ corresponds to a diameter of the poppet valve 6.

Next, it is judged whether or not the poppet valve 6 is in the operation start timing (S1106). The operation start corresponds to a timing for starting the valve opening operation under the valve closing state, and a timing for starting the valve closing operation under the opening state.

If the valve operation start timing is not established (no in S1106), the present process is temporarily finished. Accordingly, in the state in which the valve operation start timing is not established (no in S1106), the processes of the steps S1100 to S1104 are repeated, and the cylinder internal pressure external force Ft is repeatedly calculated sequentially.

If the valve operation start timing for opening the valve or closing the valve is established (yes in S1106). The sequential cylinder internal pressure external force Ft calculated in the immediately preceding steps S1100 to S1104 is set as the cylinder internal pressure external force Fcl (S1108).

Accordingly, in each of the first to fourth embodiments mentioned above, the cylinder internal pressure external force Fcl is determined, and the attraction current application start displacements A and A2, the brake current application end displacement A1 and the target floating position Sf are determined by using it together with the neutral position deviation.

Figure 28:
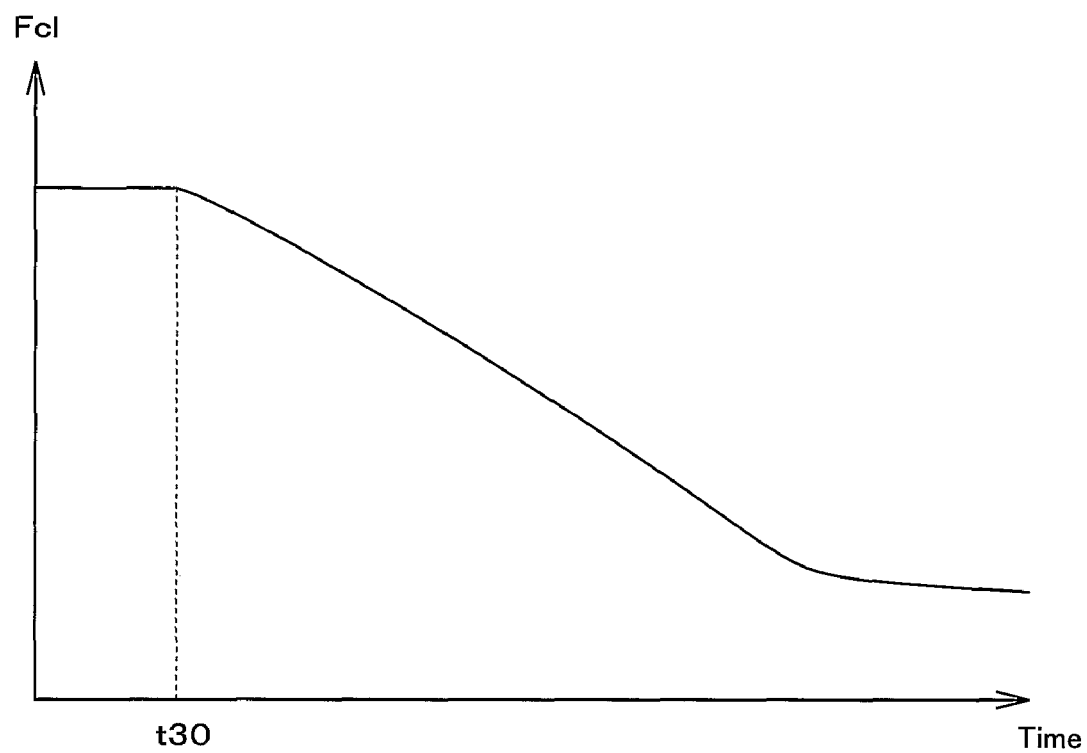
FIG. 28 is a timing chart showing an example of a control in the fifth embodiment.

In the valve opening control of the exhaust valve, for example, as shown in a timing chart in FIG. 28, the cylinder internal pressure external force Fcl in the initial stage (t30) of the valve opening timing is known. Accordingly, it is possible to thereafter execute the proper sliding mode control.

In the structure mentioned above, the correspondence to claims is as follows. In the relations mentioned in each of the embodiments, the relationship is different from the other embodiments in a point that the cylinder internal pressure external force calculating process (FIG. 26) corresponds to a process performed by a disturbance detecting section.

In accordance with the fifth embodiment mentioned above, the following advantages are obtained.

(1) It is possible to obtain the advantages of any one of the first to fourth embodiments mentioned above to which the present embodiment is applied.

(2) Since the cylinder internal pressure external force Fcl can be detected without using the cylinder internal pressure sensor 2b and the port pressure sensor 2c, it is possible to simplify the entire system with respect to the electromagnetic valve 4.

Other Embodiments (a) In each of the embodiments mentioned above, the maps MAPa, MAPa2 and MAPa1 for calculating the attraction current application start displacements A and A2 and the brake current application end displacement A1, and the map MAPsf for calculating the target floating position Sf are calculated by the cylinder internal pressure external force Fcl and the neutral position deviation Dmp. In addition, it is possible to form a map for calculating the attraction current application start displacements A and A2 and the brake current application end displacement A1 only by the cylinder internal pressure external force Fcl, or a map for calculating the target floating position Sf. Further, it is possible to form a map for calculating the attraction current application start displacements A and A2 and the brake current application end displacement A1 only by the neutral position deviation Dmp, or a map for calculating the target floating position Sf.

(b) In the second embodiment, the brake current application end displacement A1 and the attraction current application start displacement A2 are respectively determined from the maps MAPa1 and MAPa2, however, the structure may be made such that any one of them is set to a fixed threshold value and only the other is calculated by the map. In accordance with this structure, it is also possible to prevent the destabilization in the sliding mode control.

In the third embodiment mentioned above, the structure may be made such that the attraction current application start displacement A or the brake current application end displacement A1 and the attraction current application start displacement A2 is set to a fixed threshold value, and only the target floating position Sf is calculated by the map MAPsf. In accordance with this structure, it is also possible to prevent the destabilization in the sliding mode control.

(c) In each of all the embodiments, the application of the maps MAPa, MAPa1, MAPa2 and MAPsf may be provided in each of the electromagnetic valves, or only one map for an average electromagnetic valve is provided so as to be applied to the control of the electromagnetic valve.

(d) In the fourth embodiment, the average deviation amount $\Delta Vs$ is calculated at three points comprising the fully open position, the fully closed position and the neutral position in the shipment correcting process (FIG. 22), however, the average deviation amount $\Delta Vs$ may be calculated by measuring only the neutral point. Alternatively, the average deviation amount $\Delta Vs$ may be calculated by measuring four points or more. Further, a new relationship f may be formed by the measured value itself by measuring ten or more points.

In the on-board correcting process (FIG. 24), it is possible to set the detected voltage V obtained after a time delay corresponding to the response of the lift sensor 18 from the timing at which the displacement x calculated from the equation of motion comes to the neutral position, to the calculation neutral position voltage Vzcal.

Further, the relationship f may be calculated on the basis of an approximation in accordance with a least square method in place of offsetting the relations g and f by the average deviation amount $\Delta Vs$ or the calculation map deviation amount $\Delta Vcm$.

(e) In the fifth embodiment mentioned above, there is employed the cylinder internal pressure external force Fcl in the early stage of the valve opening timing, however, it is possible to utilize for the sliding mode control by determining the cylinder internal pressure external force Fcl with respect to the other timings than the early stage.

The invention claimed is:

1. A sliding mode control apparatus, wherein, when displacing a controlled object to which an urging force is applied by an elastic member from one displacement end to an other displacement end, the control apparatus sets a switching hyperplane and controls the controlled object by using a sliding mode control in such a manner that a state quantity of the controlled object is converged on the switching hyperplane, wherein, in the sliding mode control, the control apparatus switches an operation mode for controlling the controlled object when the controlled object passes an operation switching point provided in a displacement region of the controlled object, the control apparatus comprising:

a disturbance detecting section that detects disturbance in the sliding mode control; and a changing section that changes the operation switching point in accordance with the disturbance detected by the disturbance detecting section.

2. The control apparatus according to claim 1, further comprising a change with time detecting section that detects a change with time of the elastic member, wherein the changing section changes the operation switching point in accordance with both of the disturbance detected by the disturbance detecting section and the change with time detected by the change with time detecting section.

3. The control apparatus according to claim 2, wherein the controlled object is a valve body provided in an electromagnetic valve of an internal combustion engine, the elastic member is a spring, and the change with time is a change with time of spring property of the spring.

4. The control apparatus according to claim 3, wherein the spring property is a neutral position of the spring.

5. The apparatus according to claim 4, wherein the change with time detecting section includes a displacement sensor that detects a displacement of the valve body, and wherein the change with time detecting section obtains displacement data by converting a detection value detected by the displacement sensor to an actual displacement according to a relationship between the detection value and the actual displacement, and measures a change with time of the neutral position of the spring based on the displacement data.

6. The control apparatus according to claim 1, wherein the controlled object is a valve body provided in an electromagnetic valve of an internal combustion engine, and wherein the disturbance is an external force that acts on the valve body on the basis of a pressure difference between an inner side and an outer side of a cylinder of the internal combustion engine.

7. The control apparatus according to claim 6, wherein the disturbance detecting section computes the pressure difference between the inner side and the outer side of the cylinder by using a cylinder internal pressure and a port pressure that are computed based a physical equation, and obtains the external force based on the computed pressure difference.

8. The apparatus according to claim 6, wherein the electromagnetic valve displaces the valve body through operation of a brake current and an attraction current or through operation of an attraction current, and wherein the operation switching point is at least one of a brake current application end displacement and an attraction current application start displacement.

9. A sliding mode control apparatus, wherein, when displacing a controlled object to which an urging force is applied by an elastic member from one displacement end to an other displacement end, the control apparatus sets a switching hyperplane and controls the controlled object by using a sliding mode control in such a manner that a state quantity of the controlled object is converged on the switching hyperplane, wherein, in the sliding mode control, the control apparatus switches an operation mode for controlling the controlled object when the controlled object passes an operation switching point provided in a displacement region of the controlled object, the control apparatus comprising:
 a change with time detecting section that detects a change with time of the elastic member;
 a changing section that changes the operation switching point in accordance with the change with time detected by the change with time detecting section.

10. The control apparatus according to claim 9, wherein the controlled object is a valve body provided in an electromagnetic valve of an internal combustion engine, the elastic member is a spring, and the change with time is a change with time of spring property of the spring.

11. The control apparatus according to claim 10, wherein the spring property is a neutral position of the spring.

12. The apparatus according to claim 11, wherein the change with time detecting section includes a displacement sensor that detects a displacement of the valve body, and wherein the change with time detecting section obtains displacement data by converting a detection value detected by the displacement sensor to an actual displacement according to a relationship between the detection value and the actual displacement, and measures a change with time of the neutral position of the spring based on the displacement data.

13. The apparatus according to claim 10, wherein the electromagnetic valve displaces the valve body through operation of a brake current and an attraction current or through operation of an attraction current, and wherein the operation switching point is at least one of a brake current application end displacement and an attraction current application start displacement.

14. A sliding mode control apparatus, wherein, when displacing a controlled object to which an urging force is applied by an elastic member from one displacement end to an other displacement end, the control apparatus sets a switching hyperplane and controls the controlled object by using a sliding mode control in such a manner that a state quantity of the controlled object is converged on the switching hyperplane, wherein the control apparatus holds the controlled object in a floating state at a target floating position in the vicinity of at least one of the displacement ends, the control apparatus comprising:
 a disturbance detecting section that detects disturbance in the sliding mode control; and
 a changing section that changes the target floating position in accordance with the disturbance detected by the disturbance detecting section.

15. The control apparatus according to claim 14, further comprising a change with time detecting section that detects a change with time of the elastic member, wherein the changing section changes the target floating position in accordance with both of the disturbance detected by the disturbance detecting section and the change with time detected by the change with time detecting section.

16. The control apparatus according to claim 15, wherein the controlled object is a valve body provided in an electromagnetic valve of an internal combustion engine, the elastic member is a spring, and the change with time is a change with time of spring property of the spring.

17. The control apparatus according to claim 16, wherein the spring property is a neutral position of the spring.

18. The apparatus according to claim 17, wherein the change with time detecting section includes a displacement sensor that detects a displacement of the valve body, and wherein the change with time detecting section obtains displacement data by converting a detection value detected by the displacement sensor to an actual displacement according to a relationship between the detection value and the actual displacement, and measures a change with time of the neutral position of the spring based on the displacement data.

19. The control apparatus according to claim 14, wherein the controlled object is a valve body provided in an electromagnetic valve of an internal combustion engine, and wherein the disturbance is an external force that acts on the valve body on the basis of a pressure difference between an inner side and an outer side of a cylinder of the internal combustion engine.

20. The control apparatus according to claim 19, wherein the disturbance detecting section computes the pressure difference between the inner side and the outer side of the cylinder by using a cylinder internal pressure and a port pressure that are computed based a physical equation, and obtains the external force based on the computed pressure difference.

21. A sliding mode control apparatus, wherein, when displacing a controlled object to which an urging force is applied by an elastic member from one displacement end to an other displacement end, the control apparatus sets a switching hyperplane and controls the controlled object by using a sliding mode control in such a manner that a state quantity of the controlled object is converged on the switching hyperplane, wherein the control apparatus holds the controlled object in a floating state at a target floating position in the vicinity of at least one of the displacement ends, the control apparatus comprising:
- a change with time detecting section that detects a change with time of the elastic member; and
- a changing section that changes the target floating position in accordance with the change with time detected by the change with time detecting section.

22. The control apparatus according to claim 21, wherein the controlled object is a valve body provided in an electromagnetic valve of an internal combustion engine, the elastic member is a spring, and the change with time is a change with time of spring property of the spring.

23. The control apparatus according to claim 22, wherein the spring property is a neutral position of the spring.

24. The apparatus according to claim 23, wherein the change with time detecting section includes a displacement sensor that detects a displacement of the valve body, and wherein the change with time detecting section obtains displacement data by converting a detection value detected by the displacement sensor to an actual displacement according to a relationship between the detection value and the actual displacement, and measures a change with time of the neutral position of the spring based on the displacement data.

25. An adjusting method for a sliding mode control apparatus that controls a displacement of a controlled object to which an urging force is applied by an elastic member, wherein an electromagnetic force is applied to the controlled object so that the controlled object is movable between two displacement ends, wherein, when no electromagnetic force is applied to the controlled object, the controlled object is located at a neutral position between the two displacement ends, wherein the control apparatus obtains, as a detection value of a displacement sensor, a displacement position of the controlled object, and converts the detection value to a displacement of the controlled object based on a predetermined relationship, wherein, when displacing the controlled object from one of the displacement ends to the other displacement end, the control apparatus sets a switching hyperplane and controls the controlled object by using a sliding mode control in such a manner that a state quantity of the controlled object, which state quantity is based on the displacement that is based on the detection value that has been converted, is converged on the switching hyperplane, wherein, in the sliding mode control, the control apparatus switches an operation mode for controlling the controlled object when the controlled object passes an operation switching point provided in a displacement region of the controlled object, the method comprising:
- obtaining a detection value from the displacement sensor in a state where the controlled object is located at each of a plurality of known displacement positions, the known displacement positions including the two displacement ends and the neutral position;
- converting each of the known displacement positions to a detection value of the displacement sensor according to the predetermined relationship; and
- correcting the predetermined relationship based on a difference between each of the detection values obtained from the displacement sensor and the corresponding one of the detection values obtained from conversion of the known displacement positions.

26. An adjusting method for a sliding mode control apparatus, wherein the control apparatus obtains, as a detection value of a displacement sensor, a position of a controlled object to which an urging force is applied by an elastic member, and converts the detection value to a displacement of the controlled object based on a predetermined relationship, wherein, when displacing the controlled object from one displacement end to the other displacement end, the control apparatus sets a switching hyperplane and controls the controlled object by using a sliding mode control in such a manner that a state quantity of the controlled object, which state quantity is based on the displacement that is based on the detection value that has been converted, is converged on the switching hyperplane, wherein, in the sliding mode control, the control apparatus switches an operation mode for controlling the controlled object when the controlled object passes an operation switching point provided in a displacement region of the controlled object, the method comprising:
- obtaining a detection value from the displacement sensor in a specific displacement state of the controlled object, the specific displacement state being determined based on an equation of motion representing a motional state of the controlled object;
- converting the specific displacement state to a detection value of the displacement sensor according to the predetermined relationship; and
- correcting the predetermined relationship based on a difference between the detection value obtained from the displacement sensor and the detection value obtained the conversion of the known displacement positions.

27. The method according to claim 26, wherein the equation of motion corresponds to a motional state in which the displacement of the controlled object is caused only by the urging force of the elastic member.

* * * * *